(12) United States Patent
Hershkovich et al.

(10) Patent No.: US 7,499,912 B2
(45) Date of Patent: *Mar. 3, 2009

(54) SEARCH METHOD USING CODED KEYS

(75) Inventors: Moshe Hershkovich, Netanya (IL); Nira Shezaf, Tel-Aviv (IL)

(73) Assignee: Hywire Ltd., Netanya (IL)

( * ) Notice: Subject to any disclaimer, the term of this patent is extended or adjusted under 35 U.S.C. 154(b) by 647 days.

This patent is subject to a terminal disclaimer.

(21) Appl. No.: 10/690,556

(22) Filed: Oct. 23, 2003

(65) Prior Publication Data

US 2005/0091443 A1    Apr. 28, 2005

(51) Int. Cl.
  *G06F 7/00*    (2006.01)
  *G06F 17/30*    (2006.01)

(52) U.S. Cl. ............... 707/3; 707/6; 707/100; 711/100

(58) Field of Classification Search ............... 707/1–10, 707/100–104.1, 200–206; 711/108, 158, 711/100
See application file for complete search history.

(56) References Cited

U.S. PATENT DOCUMENTS

| | | | | |
|---|---|---|---|---|
| 5,933,104 | A * | 8/1999 | Kimura | 341/87 |
| 6,219,662 | B1 * | 4/2001 | Fuh et al. | 707/3 |
| 6,434,662 | B1 | 8/2002 | Greene et al. | 711/108 |
| 6,633,953 | B2 * | 10/2003 | Stark | 711/108 |
| 7,219,184 | B2 * | 5/2007 | Stojancic | 711/5 |
| 2002/0007446 | A1 * | 1/2002 | Stark | 711/158 |
| 2003/0093646 | A1 | 5/2003 | Stark | 711/219 |
| 2004/0019737 | A1 | 1/2004 | Kastoriano et al. | 711/104 |

OTHER PUBLICATIONS

Kobayashi, M. et al., A longest prefix match search engine for multi-gigabit IP processing, Jun. 18-22, 2000, IEEE, vol. 3, 1360-1364.*
Kleiner, C. et al., Efficient index structures for spatio-temporal objects, Sep. 4-8, 2000, IEEE, 881-888.*
U.S. Appl. No. 10/688,986, filed Oct. 2003, Stark.
U.S. Appl. No. 10/229,054, filed Aug. 2002, Stark.
D. Knuth: "The Art of Computer Programming" vol. 3 in "Sorting and Searching" pp. 506-549, Addison—Wesley, Reading, Mass (1973).
Sedgewick Algorithms in C++, pp. 231-243, Addison Wesley, Reading, Mass (1992).
Bohannon et al, Main memory Index Structures with Fixed Size Partial Keys (Mar. 28, 2001).

* cited by examiner

*Primary Examiner*—Jean B Fleurantin
(74) *Attorney, Agent, or Firm*—Mark M. Friedman

(57) ABSTRACT

A computer-implemented method of searching an ordered database using transformed key entries including the steps of: (a) providing a system having: (i) a memory for storing a plurality of key entries, and (ii) processing logic for transforming said key entries into coded entries, and for searching the coded entries; (b) performing a pre-determined transformation of each key entry so as to obtain a plurality of coded entries, and (c) performing a deterministic search in at least one data structure within the memory to obtain a match between an input key and a key entry.

41 Claims, 3 Drawing Sheets

SEARCH METHOD USING CODED KEYS

FIELD AND BACKGROUND OF THE INVENTION

The present invention relates to a method and device for searching an ordered database containing key entries, and, more particularly, to a method and device for searching a monotonically-ordered database using transformed keys.

It is known that a large storage capacity is required for data packet classification and forwarding, in which large amounts of information must be stored in the information base. Storage space limitations affect all state-of-the-art ASEs, including Content Addressable Memories (CAMs) such as Binary CAMs and Ternary CAMs. Storage space limitation is also a key issue in the search engine technologies of HyWire Ltd.

Searching techniques typically require repeated accesses or probes into the memory storage in order to perform key comparisons. In large storage and retrieval systems, such searching, even if augmented by efficient search algorithms such as a binary search or higher-order B-tree searches or prefix B-tree searches, often requires an excessive amount of time (clock cycles).

Another well-known and generally faster method for storing and retrieving information from computer store involves the use of so-called "hashing" techniques. In a system using hashing, the key is operated upon by an operator to produce a storage address in the storage space. The operator is called a hashing function, and the storage space is called a hash table. The storage address is then used to access the desired storage location directly with fewer storage accesses or probes than sequential or binary searches. Hashing techniques are described in the classic text by D. Knuth entitled *The Art of Computer Programming*, Volume 3, in "Sorting and Searching", pp. 506-549, Addison-Wesley, Reading, Mass. (1973), and more recently, in the contemporary classic text of R. Sedgewick entitled *Algorithms in C++*, pp. 231-243, Addison-Wesley, Reading, Mass. (1992).

Hashing functions are designed to translate the universe of keys into addresses uniformly distributed throughout the hash table. Typical hashing operations include truncation, folding, transposition and modulo arithmetic. A disadvantage of hashing techniques is that more than one key can translate into the same storage address, causing "collisions" in storage or retrieval operations. Some form of collision-resolution strategy must therefore be provided. For example, the simple strategy of searching forward from the initial storage address to the first empty storage location will resolve the collision. This technique is called linear probing. If the hash table is considered to be circular so that addresses beyond the end of the table map back to the beginning of the table, then the linear probing is done with "open addressing," i.e., with the entire hash table as overflow spare in the event that a collision occurs.

An alternative to linear probing is a technique commonly referred to as "double hashing" or "multiple hashing". When more than one key translates into the same storage address using the first hash function, the collision can be resolved by selecting a different hash function and "rehashing" those keys (that had returned identical results using the first hash function) in order to differentiate between them. Of course, there is a finite probability that more than one key will translate into the same storage address using the second hash function, in which case the new collision can be resolved by selecting a (different) third hash function and "rehashing" those keys once again in order to differentiate between them. This process can be repeated until all collisions have been resolved.

According to Sedgewick, double hashing uses fewer probes, on the average, than linear probing. Sedgewick cites several examples of improved hashing methods, but cautions against 'premature use of advanced methods except by experts with serious searching applications, because separate chaining and double hashing are simple, efficient, and quite acceptable for most applications.'

One area in which multiple hashing is less effective or even problematic is network applications. Although the average speed is an important parameter in such applications, a more important and often overriding requirement is a highly predictable, deterministic operation. For example, voice and video recordings can be transmitted as data via the Internet using a digital data channel. The Internet network utilizes routers to direct the data from the sending address to the destination address. Routers using multiple hashing routines to locate the destination address and deliver these data packets will have a characteristically high variance in the time required to locate the address. In most cases, typically about 70%-80% of the time, the multiple hashing technique will locate the destination address in the first memory access. However, in about 20%-30% of the time, a second memory access is required. Often, a third, fourth or fifth memory access is required in order to locate the address. Moreover, in the case of voice transmission, a high variance of this kind results in a broken up, non-uniform sound message. These disturbances are often referred to as "jitter".

U.S. Pat. No. 6,434,662 to Greene, et al., discloses a system and method for searching an associative memory using input key values and first and second hashing functions. After a first hash function, the hash-based associative system allows for the selection of a second hash function that has been pre-computed at table build time to be perfect with respect to a small set of colliding key values, provides a deterministic search time independent of the number of table entries or width of the search key, and allows for pipelining to achieve highest search throughput.

Although the deterministic search time is of advantage, the pre-computing to identify the second hash function is laborious. Moreover, the pre-computing must be redone, inter alia, each time that an entry is added to or removed from the database.

Moreover, while hashing methods are suitable for exact search applications, hashing methods are inherently inappropriate for range search applications.

Also known in the art are Prefix B-trees, in which each node is searched in the same manner as a B-tree, but each key $K_i$ in a Prefix B-tree is not a full key but is a prefix to a full key. The keys $K_i$ of each node in any subtree of a Prefix B-tree all have a common prefix, which is stored in the root node of the subtree, and each key $K_i$ of a node is the common prefix of all nodes in the subtree depending from the corresponding branch of the node. In a binary variant of the Prefix B-Tree, referred to as a Prefix Binary Tree, each node contains only one branch key and two branches, so that there are only two ("binary") branches from any node. The Prefix Binary Tree is searched in the same manner as a Binary Tree, that is, branching left or right depending on whether the search key is less than or greater than the node key. There are also Bit Tree variants of the Prefix Binary Tree wherein distinction bits rather than prefixes are stored in the nodes. In particular, the values stored are the numbers of the bits in the keys that are different between two prefixes, thus indicating the key bits to be tested to determine whether to take the right or left branches.

It may thus be summarized that in the various types of Prefix Trees, a compression-like scheme is used to reduce the size of the entries stored in the tree. The key-compression approach has the benefit that the entire key value can be constructed without accessing data records or de-referencing pointers.

However, as noted by Bohannon, et al., in "Main-Memory Index Structures with Fixed-Size Partial Keys" (Mar. 28, 2001):

typical compression schemes such as employed in prefix B-trees have the disadvantage that the compressed keys are variable-sized, leading to undesirable space management overheads in a small, main-memory index node. Further, depending on the distribution of key values, prefix-compressed keys may still be fairly long resulting in low branching factors and deeper trees.

Bohannon, et al., go on to propose a partial-key approach that uses fixed-size parts of keys and information about key differences to minimize the number of cache misses and the cost of performing compares during a tree traversal, while keeping a simple node structure and incurring minimal space overhead:

A key is represented in a partial-key tree by a pointer to the data record containing the key value for the key, and a partial key. For a given key in the index, which we refer to as the index key for the purposes of discussion, the partial key consists of (1) the offset of the first bit at which the index key differs from its base key, and (2) l bits of the index key value following that offset (l is an input parameter). Intuitively, the base key for a given index key is the most recent key encountered during the search prior to comparing with the index key.

Bohannon, et al., articulate that "of the indexing schemes studied, partial-key trees minimize cache misses for all key sizes". Bohannon, et al., further articulate that "the partial-key approach relies on being able to resolve most comparisons between the search key and an index key using the partial-key information for the index key. If the comparison cannot be resolved, the pointer to the data record is de-referenced to obtain the full index key value." Thus, in the partial-key method taught by Bohannon, et al., the cache misses during the search operation, however reduced with respect to other indexing schemes, are a finite statistical probability that must be contended with. This partial-key method is thus inherently non-deterministic. Moreover, the possibility of such a cache miss renders pipelining using hardware solutions impractical, if not impossible.

There is therefore a recognized need for, and it would be highly advantageous to have, a high throughput, fully deterministic method of searching a database, a method that is efficient with regard to memory space, requires a low bandwidth, enables quick and facile maintenance of the database, and is inherently suitable for a pipelined hardware architecture.

SUMMARY OF THE INVENTION

The present invention is a method and device for searching a monotonically-ordered database using transformed keys.

According to the teachings of the present invention there is provided a computer-implemented method of searching an ordered database using transformed key entries including the steps of: (a) providing a system having: (i) a memory for storing a plurality of key entries, and (ii) processing logic for transforming the key entries into coded entries, and for searching the coded entries; (b) performing a pre-determined transformation of each key entry so as to obtain a plurality of coded entries, and (c) performing a deterministic search in at least one data structure within the memory to obtain a match between an input key and a key entry.

According to another aspect of the present invention there is provided a computer-implemented method of searching an ordered database using transformed key entries, the method including the steps of: (a) providing a system including: (i) a memory for storing a plurality of key entries; (ii) processing logic for transforming the key entries into coded entries, and for searching the coded entries; (b) performing a transformation of each key entry of the plurality of key entries so as to obtain a plurality of coded entries; (c) arranging the coded entries in a search-tree structure having at least one node, such that each node includes a plurality of the coded entries, and (d) performing a deterministic search within at least one node of the search-tree structure so as to obtain a match between an input key and a key entry.

According to yet another aspect of the present invention there is provided a computer-implemented method of searching an ordered database using transformed key entries, the method including the steps of: (a) providing a system including: (i) a memory for storing a plurality of key entries, and (ii) processing logic for transforming the key entries into coded entries, and for searching the coded entries; (b) performing a pre-determined transformation of each key entry so as to obtain a plurality of coded entries; (c) arranging the coded entries in a search-tree structure having at least one node, such that each node includes a plurality of the coded entries, and (d) performing a pipelined search within the search-tree structure so as to obtain a plurality of matches, each of the matches representing a match between a particular, respective input key and a particular key entry of the key entries.

According to further features in the described preferred embodiments, the search is deterministic with respect to specific key data.

According to still further features in the described preferred embodiments, the specific key data includes the input key.

According to still further features in the described preferred embodiments, the specific key data includes the key entries.

According to still further features in the described preferred embodiments, the specific key data includes the coded entries in the data structure.

According to still further features in the described preferred embodiments, the search is a pre-determined search.

According to still further features in the described preferred embodiments, each coded entry includes information relating to at least one different key entry.

According to still further features in the described preferred embodiments, a first coded entry includes positional information relating to a first different key entry, and a second coded entry includes positional information relating to a second different key entry.

According to still further features in the described preferred embodiments, the at least one different key entry is a single key entry.

According to still further features in the described preferred embodiments, the information includes information resulting from at least one varying bit.

According to still further features in the described preferred embodiments, the at least one varying bit includes a most significant bit.

According to still further features in the described preferred embodiments, the transformation is a deterministic transformation.

According to still further features in the described preferred embodiments, the transformation is a pre-determined transformation.

According to still further features in the described preferred embodiments, the performing of the deterministic search includes: (i) processing the coded keys to determine a required set of auxiliary data, the set being required to proceed with the search, and (ii) using the required set of auxiliary data for an additional processing of the coded keys so as to determine a result of the search.

According to still further features in the described preferred embodiments, the auxiliary data includes a portion of a key entry, and the portion is then compared to the input key.

According to still further features in the described preferred embodiments, the search is an exact search, wherein the performing of the deterministic search includes: (i) processing the coded keys to determine a required set of auxiliary data, the set being required to proceed with the search, and (ii) comparing the set with the input key to determine a result of the search.

According to still further features in the described preferred embodiments, when a certain match exists between the input key and a key entry, the deterministic search is performed solely by processing of the coded keys.

According to still further features in the described preferred embodiments, the method further includes the step of: storing the plurality of key entries in a particular order.

According to still further features in the described preferred embodiments, the particular order is a monotonic order.

According to still further features in the described preferred embodiments, the transformation is a unidirectional transformation.

According to still further features in the described preferred embodiments, the each coded entry includes positional information relating to a different respective key entry.

According to still further features in the described preferred embodiments, the search within each node or list is deterministic with respect to a required amount of auxiliary data.

According to still further features in the described preferred embodiments, the auxiliary data includes at least a portion of a key entry.

According to still further features in the described preferred embodiments, the size of the auxiliary data equals less than half of the size of the key entries.

According to still further features in the described preferred embodiments, the auxiliary data is a portion of a single key entry.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
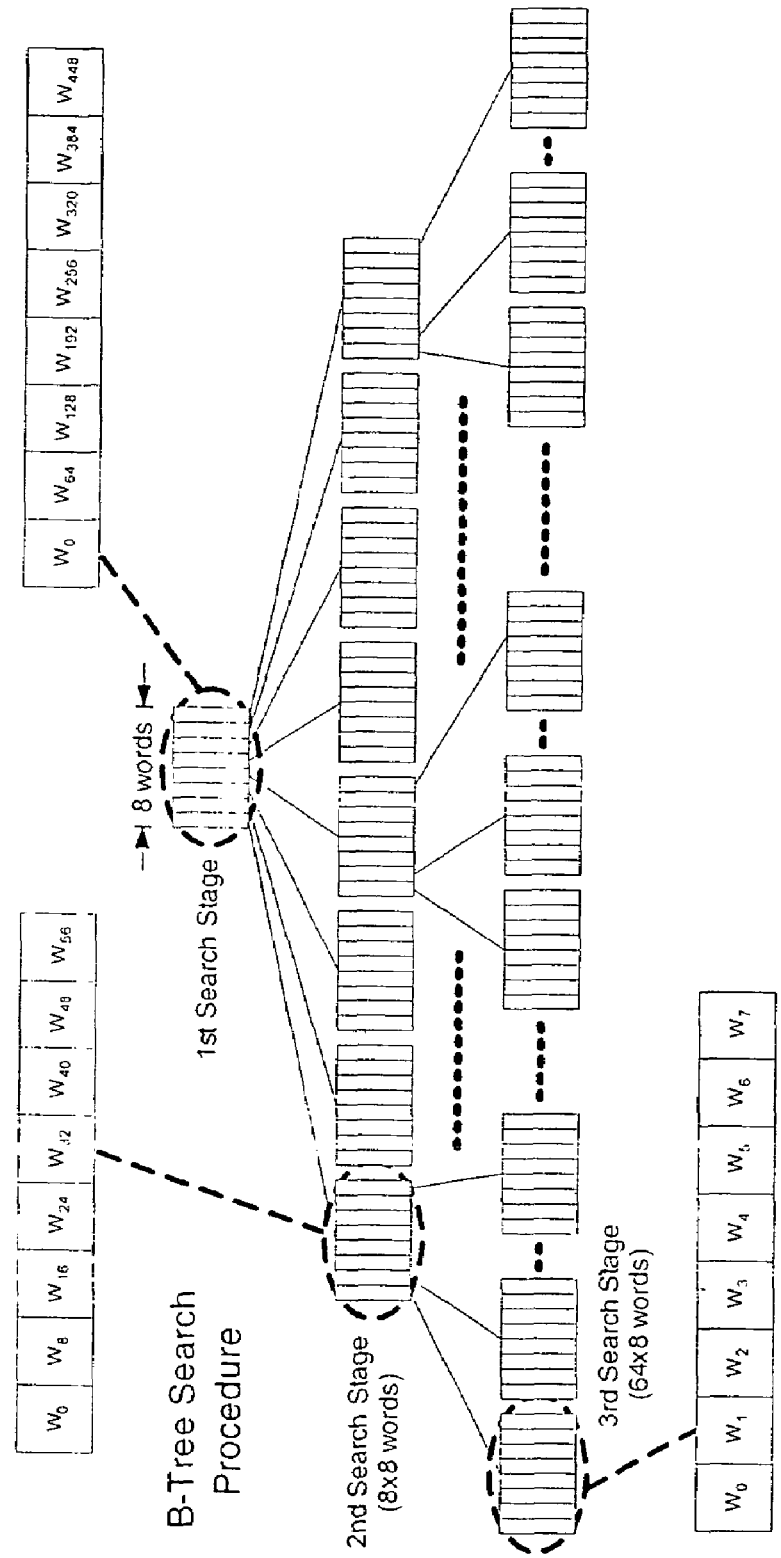
FIG. 1 shows a schematic example of a B-tree structure for a search procedure in a very small database containing 512 words, each having 128 bits.

The present invention is a method and device for searching a monotonically-ordered database using transformed keys.

The principles and operation of the search method and device of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

In this method, a one-to-one deterministic transformation is applied to the Key Entries to generate a second database with corresponding "short" or "compacted" Transformed (or "Coded") Keys, each consisting of a number of bits that is lower than that of the original "long" Key Entries. The Transformed Keys can be used in search trees to reduce the size of nodes in each tree level, where each node has one or more entries. If the length of the Key Entries is reduced by a specified factor when transformed into "short" Keys, then the size of each node can be reduced accordingly. If the same number of nodes is kept in the tree level, the bandwidth is reduced by the same factor for each node, so the time for retrieving a node is reduced. Alternatively, the number of entries per node can be increased by the same factor, thereby reducing the number of tree levels. In either alternative, or using a combined solution involving a convenient tradeoff, the search rate increases significantly. Another alternative is to retain the previous consumed bandwidth, enabling the support of a much larger database.

The transformation applied to the Key Entries to generate the corresponding short Keys can be unidirectional. The database with the short Keys can be arranged in monotonic order as the original database, and can be used to perform most of the search procedure to identify a "short" Key corresponding to a long Key Entry that may match the Searched Key. Then, only a portion of ("a portion" meaning a fraction$\geq 1$) a long Key Entry (of the original database) that corresponds to the identified short Key is compared to the Searched Key to as part of the search process to establish a definite Match or No-Match. This method yields a faster search procedure and less search hardware due to the lower number of bits to be processed. In the case of very large databases, the Key Transformation can be applied recursively to short Keys to generate an increasingly smaller number of bits to process.

One way of implementing a deterministic transformation of the Key Entries to generate short Keys is by coding each long Key Entry according to its relative position in the database or in reference to the value of a neighboring Key Entry.

The resulting Coded Key is then unique and a search procedure yields necessarily a specific Coded Key in case of a Match. In particular, a Coded Key may be determined by comparing the corresponding long Key Entry with the previous Key Entry in the database and recording the position index of a changing bit (also termed "varying bit"), e.g., the most significant bit (MSB) among the changing bits in the long Key Entry.

An exemplary search method involving a one-to-one deterministic transformation algorithm, denoted as a Search Method using Coded Keys (SMCK) algorithm, is described in detail hereinbelow. In this method, the long Key Entries are coded to generate a list of Coded Keys, each Coded Key having a length equal to the logarithm in base 2 of the length of the corresponding long Key Entry. The list of Coded Keys, which requires a small fraction of the storage space required by the original list of long Key Entries, is stored along with the original list of long Key Entries. However, most of the search procedure is performed within the list of Coded Keys instead of the long Key Entries, yielding a faster search and most efficient use of the data busses. A fast preliminary search operation is performed in the list of Coded Keys to find a potentially matching Coded Key. The search method then proceeds with a comparison of the Searched Key with the long Key Entry corresponding to the potentially matching Coded Key. If the long Key Entry does not exactly match the Searched Key, then a focused search is performed in a limited set of Coded Keys around the Coded Key determined by the preliminary search; this focused search yields a Key Index. The Key Index allows the retrieval of the long Key Entry and/or Associated Data (AD), as necessary. This search method can be implemented in hardware or software for use in any database.

The method of the present invention may serve to code and search data in various RAM-Based CAM configurations, some of which have been disclosed in previous U.S. Patent Applications to HyWire Ltd. These include RAM-Based Binary CAM, dealing with binary integers (integers with single values), disclosed in U.S. patent application Ser. No. 10/229,054, and RAM-Based RCAM, used for range integers (integers within a range of values) disclosed in U.S. patent application Ser. No. 10/229,065.

The coding and search method can be applied to Multi-RAM Binary CAM and RCAM configurations, disclosed in U.S. patent application Ser. No. 10/206,189, which teaches multiple RAMs integrated in a single device. The coding and search method can also be applied to the Associative Search Engine (ASE) disclosed in a co-pending U.S. patent application entitled "Multi-Dimensional Associative Search Engine Having an External Memory", also assigned to HyWire Ltd.

All of the above-referenced applications are incorporated by reference for all purposes as if fully set forth herein.

Coding Principle

It is noted in passing that the exemplary coding principle described hereinbelow and the successive search and maintenance procedures are developed under the assumption that the long Key Entries and the corresponding Coded Keys are arranged in monotonically ascending order. However, it will be recognized by one skilled in the art that various other conventions regarding the order of the Key Entries and the Coded Keys are possible. Similarly, the comparison of bits, described hereinbelow, could be performed in alternative ways, and is therefore presented as an exemplary comparison method.

A Coded Key is the position index of the most significant bit (MSB) among the changing bits in a long Key Entry when compared to the previous Key Entry. If a Key Entry consists of N bits, then only $\log_2 N$ bits (or the closest larger integer) are needed to represent any position index of this Key Entry in binary notation. Thus, a Coded Key consists of a number of bits equal to the closest integer larger than $\log_2 N$. In the examples presented below, the Coded Keys are represented in decimal notation.

Table 1 shows an example of applying this method for coding the Key Entry 101110 stored after 101000. The current Key Entry differs from the previous one in two bits located in positions 2 and 1 (in decimal notation); according to the disclosed method, the Coded Key corresponds to the MSB among the two, i.e., 2. The Key Entry bit that corresponds to the Coded Key, denoted as the "Coded Bit", is shadowed. The Coded Key requires in this case (for a Key Entry with 6 bits) a number of bits equal to the closest integer larger than $\log_2 6$, i.e., 3 bits.

It should be noted that the Coded Key is generated under the assumption that the first Key Entry in a list or the Key Entry preceding the first one in a list has a specified reference value. For simplicity (and by convention), this value is usually "all zeros", in this case, 000000. Thus, the Coded Key is the MSB that is equal to 1. The "all zeros" value is a special case, and although it does not have a "1" bit, it is assigned a Coded Key=0.

TABLE 1

Example of a Coded Key Corresponding to the Change in a Long Key Entry

| | Key Entry (543210) | | Coded Key |
|---|---|---|---|
| Previous Key Entry | 101000 | | 5 |
| Current Key Entry | 101110 | → | 2 |

Basic Search Procedure Using Coded Keys

Two basic search procedures using Coded Keys are disclosed: an Exact Search and a Range Search.

In a regular Exact Search, the Searched Key SK is compared with the key entries $K_i$ listed in the database in search for an Exact Match (identical values). If there is a Key Index i such that $SK=K_i$, then the key entry $K_i$ matches the Searched Key. In this case, the Key Index i can be used to retrieve the Associated Data (AD) listed under the same index. The AD can serve, inter alia, as a pointer to a node in a succeeding search level. If $SK \neq K_i$ for all indices i, then there is No Exact Match and no valid AD can be retrieved.

In a regular Range Search, the Searched Key SK is compared with the key entries $K_i$ in search for a Range Match (inclusion within a range). If there is a Key Index i such that $K_i \leq SK < K_{i+1}$, then $K_i$ matches the defined searched range; the Key Index i can be used to retrieve the AD listed under the same index. If the submitted key is larger than all the key entries in the database, then the last key entry is defined as the matching key. If $SK<K_i$ for all indices i, then there is No Match and no valid AD can be retrieved.

The Exact and Range search procedures are significantly expedited when Coded Keys are used, but the corresponding long Key Entries must meet the Exact and Range Match conditions as in the regular search procedures. The list of Coded Keys must be generated from the corresponding Key Entries prior to their use in the search procedures.

A sequential search of the submitted key in a database using Coded Keys can be completed in two steps in case of an Exact Search and three steps for a Range Search. The first step of both search procedures is identical. In the Basic Exact Search Procedure, the search procedure consists of:

Step 1: Fast preliminary search operation in the list of Coded Keys to find a potentially matching Coded Key.

Step 2: Comparison of the Searched Key with the long Key Entry corresponding to the potentially matching Coded Key. In the case that the keys are equal, the matching Key has been successfully identified, allowing, inter alia, for the retrieval of the AD. If the keys are not equal, then a matching key does not exist in the database.

An Exact Search procedure of a submitted key that is definitely (i.e., known to be) contained in the database does not require access to long Key Entries. In this case, the search is performed only in the list of Coded Keys (first step), because the potentially matching Coded Key found in this step is certainly the matching Coded Key, and no further check of the long Key Entry is required.

In the Basic Range Search Procedure, the search procedure consists of:

Step 1: Fast preliminary search operation in the list of Coded Keys to find a potentially matching Coded Key.

Step 2: Comparison of the Searched Key with the long Key Entry corresponding to the potentially matching Coded Key. In case of an Exact Match, the matching Key Index can be used to retrieve the long Key Entry and/or the AD, as necessary, according to the Exact Match procedure.

Step 3: If no Exact Match is found, a focused search is performed in a limited set of Coded Keys around the Coded Key determined by the preliminary search in step 1, so as to yield a Key Index. The Key Index allows the retrieval of the long Key Entry and/or the AD, as necessary.

According to one embodiment of the present invention, the method for searching a submitted key in a list of Coded Keys utilizes Partially Reconstructed Keys (PRKs). A PRK is reconstructed for each Key Entry, based on the previous PRK and the current Coded Key, and does not require the use of long Key Entries. The partial reconstruction proceeds as follows:

1. The more significant bits of the previous PRK are copied up to the Coded Bit (the bit at the position defined by the Coded Key).
2. The Coded Bit is set to "1".
3. The less significant bits after the Coded Bit are considered to be "unknown" and are denoted by "U". Alternatively, these bits may be represented by zeros and disregarded during the search procedure.

It is noted that the PRK list is generated under the assumption that the first Key Entry in a list or the Key Entry preceding the first one in a list has a specified reference value. For simplicity, this value is usually "all zeros", in this case, 000000. Thus, the first Coded Key is the MSB that is equal to 1. The corresponding PRK has a value of "1" for the Coded Bit, "zeros" in all the more significant bits and "unknown" values in all the less significant bits (e.g., 0001UUUUU for Coded Key=5).

Table 2 shows the PRK corresponding to the current Key Entry in the example of Table 1. The Coded Key for the current Key Entry 101110 is 2, as before. The Coded Bit is shadowed. The less significant bits after the Coded Bit in the PRK are denoted by "U".

TABLE 2

Example of a Coded Key and PRK Corresponding to the Change in a Long Key Entry

| | Key Entry (543210) | | Coded Key | PRK (543210) |
|---|---|---|---|---|
| Previous Key Entry | 101000 | | 5 | 1UUUUU |
| Current Key Entry | 101110 | → | 2 | 1UU1UU |

Table 3 shows another example of applying the Key Coding method (with the PRK's) in a list of Key Entries, starting with 100001. Since the MSB that is equal to 1 is in this case 5, the Coded Key is 5. In each PRK, the more significant bits of the previous PRK are copied up to the Coded Bit, the Coded Bit is set to "1", and the less significant bits after the Coded Bit are denoted by "U".

According to the present invention, the method for searching a submitted key in a list of Coded Key preferably uses PRKs, each reconstructed for a Key Entry based on the previous PRK and the current Coded Key. Each PRK is sequentially compared with the submitted Key. The key search may yield an Exact Match for binary integers or a Range Match for range integers.

TABLE 3

Example of Key Coding Method Applied to a List of Key Entries

| Key Entry (543210) | | Coded Key | PRK (543210) |
|---|---|---|---|
| 100001 | → | 5 | 1UUUUU |
| 100010 | → | 1 | 1UUU1U |
| 100101 | → | 2 | 1UU1UU |
| 101000 | → | 3 | 1U1UUU |
| 101001 | → | 0 | 1U1UU1 |
| 101011 | → | 1 | 1U1U1U |

The Exact Match search algorithm consists of two main steps:

1. Sequential comparison of the Searched Key with the PRKs and tracking of the possibly matching results (marked with "✓"). The possibly matching results are the PRKs where all the bits "1" contained in the PRKs are also included in the Searched Key at the same positions (the other bits of the PRKs, denoted by "U", are disregarded). The last matching result, involving the largest Key Entry, is a Potential Exact Match Key (PEMK). If no possibly matching results are found, a No Exact Match indication may be issued and the search algorithm is over. Note: If a "zero" Key is searched, no possibly matching results are found in step 1. However, in this special case, the search algorithm is not over and step 2 is performed, and the first Key Entry in the list, which is the PEMK in this case, is retrieved.

2. Checking for actual Exact Match by comparing the Searched Key with the PEMK. If this Key Entry is an Exact Match, the AD may be retrieved according to the respective Key Index; if not, a No Exact Match indication may be issued.

Table 4 shows an example of an Exact Match search for the key 100101 (listed repeatedly for clarity), by sequential comparison of the Searched Key with the PRKs and tracking of the possibly matching results (marked with "✓"). The last matching result yields 1UU1UU corresponding to the Key Entry 100101, which exactly matches the Searched Key.

Thus, the AD may be retrieved according to Key Index 2.

TABLE 4

Example of Exact Match Search Using PRKs

| Key Index | Key Entry (543210) | | Coded Key | PRK (543210) | Search Result | Searched Key (543210) | Note |
|---|---|---|---|---|---|---|---|
| 0 | 100001 | → | 5 | 1UUUUU | ✓ | 100101 | |
| 1 | 100010 | → | 1 | 1UUU1U | — | 100101 | |
| 2 | 100101 | → | 2 | 1UU1UU | ✓ | 100101 | PEMK |
| 3 | 101000 | → | 3 | 1U1UUU | — | 100101 | |
| 4 | 101001 | → | 0 | 1U1UU1 | — | 100101 | |
| 5 | 101011 | → | 1 | 1U1U1U | — | 100101 | |

It is noted that the Exact Match search algorithm is shown above as an example in reference to Table 4, however, it is generally applicable to any type of database arranged in logical order. Similarly, the exemplary Range Match search algorithms shown below in reference to Tables 5 and 6 are also generally applicable. The validity of the search algorithms for Exact and Range Matches is systematically proven hereinbelow.

provided in Table 4 for an Exact Match search for the key 100101 also holds in this case.

Case 2: Searched Key Larger than the Matched Key Entry

This algorithm consists of three main steps (refer to the example provided in Table 5):

1. Sequential comparison of the Searched Key with the PRKs. The last matching result is a PEMK.
2. Identification of the MSMb in the Searched Key corresponding to the last matching PRK. In this example, the last matching PRK is 1UUUUU, and MSMb=3, because this is the MSB which is 1 in the Searched Key and 0 in the long Key Entry.
3. Sequential comparison of the Coded Keys (starting from one after the PEMK in ascending order) with the MSMb, identification of the first Coded Key that is larger than the MSMb index (4 in this example), denoted as GTMSMb, selection of the previous long Key Entry (100101) as the Range Match Key (RMK), and retrieval of the AD corresponding to the matching Key Index. If such a Coded Key is not found, the Searched Key is larger than all the Key Entries in the list, and the last Key Entry is the RMK.

TABLE 5

Example of Range Match Search where the Searched Key is Larger than the Matched Key Entry

| Key Index | Key Entry (543210) | | Coded Key | PRK (543210) | Search Result | Searched Key (543210) | Note |
|---|---|---|---|---|---|---|---|
| 0 | 100001 | → | 5 | 1UUUUU | ✓ | 101000 | PEMK |
| 1 | 100010 | → | 1 | 1UUU1U | — | 101000 | |
| 2 | 100101 | → | 2 | 1UU1UU | — | 101000 | RMK |
| 3 | 110000 | → | 4 | 11UUUU | — | 101000 | GTMSMb |
| 4 | 110001 | → | 0 | 11UUU1 | — | 101000 | |
| 5 | 110011 | → | 1 | 11UU1U | — | 101000 | |

The algorithm for a Range Match search consists of three main steps:
1. Sequential comparison of the Searched Key with the PRKs. This step is identical to that in the Exact Match algorithm, i.e., the last matching result is a Potential Exact Match Key (PEMK). In this case, however, if no possibly matching results are found, the PEMK is specified to be the first long Key Entry in the list.
2. The Searched Key is checked for actual Range Match by comparison with the PEMK. This check has three possible results or cases, which are detailed hereinbelow: an Exact Match, Searched Key larger than the Key Entry, and Searched Key smaller than the Key Entry. In the case of an Exact Match, the matching long Key Entry is precisely this match, and the AD can be retrieved. In case of a Non-Exact Match, the Most Significant Mismatch bit (MSMb), which is the MSB where the Searched Key and the long Key Entry do not match, must be identified.
3. When the Searched Key is larger or smaller than the Key Entry, a sequential comparison of the Coded Keys with the MSMb is required to determine the Range Match. A Range Match can always be found and the AD can be retrieved; the identified Key Entry is designated Range Match Key (RMK).

Case 1: Exact Match

The case of an incidental Exact Match result during a Range Search (in the second step) is identical to the Exact Match procedure for binary integers. Hence, the example The algorithm for the Range Match search works in this case for the following reasons:

If the Coded Key is smaller than the MSMb, then the corresponding long Key Entry is smaller than the Searched Key. This is because smaller Coded Keys correspond to PRKs where the bits that change are less significant than the MSMb.

Similarly, if the Coded Key is larger than the MSMb, then the corresponding long Key Entry is larger than the Searched Key. Thus, the first larger Coded Key after the MSMb (GTMSMb) represents the first long Key Entry that is larger than the Searched Key, so the previous Key Entry is the Range Match Key (RMK).

It is noted that a long Key Entry with a Coded Key equal to the MSMb cannot be included in the database between the PEMK (found in step 1 above) and the Key Entry corresponding to the GTMSMb, as is evident from the proof provided hereinbelow.

Case 3: Searched Key Smaller than the Matched Key Entry

This algorithm consists of three main steps (refer to the example provided in Table 6):

1. Sequential comparison of the Searched Key with the PRKs. The last matching result is a PEMK.

2. Identification of the MSMb in the Searched Key corresponding to the last matching PRK. In this example, the last matching PRK is 11U1U1, and MSMb=3, because this is the MSB which is 0 in the Searched Key and 1 in the long Key Entry.
3. Sequential comparison of the Coded Keys (starting from the PEMK in descending order) with the MSMb, identification of the first Coded Key that is larger than the MSMb index (4 in this example), denoted as GTMSMb, selection of the previous long Key Entry (100110) as the Range Match Key (RMK), and retrieval of the AD corresponding to the matching Key Index. If such Coded Key is not found, then the Searched Key is smaller than all the Key Entries in the list, the Searched Key is considered to be out of range, and the matching Key Index is assigned the value "−1".

TABLE 6

Example of Range Match Search where the Searched Key is Smaller than the Matched Key Entry

| Key Index | Key Entry (543210) | | Coded Key | PRK (543210) | Search Result | Searched Key (543210) | Note |
|---|---|---|---|---|---|---|---|
| 0 | 100101 | → | 5 | 1UUUUU | ✓ | 110101 | |
| 1 | 100110 | → | 1 | 1UUU1U | — | 110101 | RMK |
| 2 | 111000 | → | 4 | 11UUUU | ✓ | 110101 | GTMSMb |
| 3 | 111100 | → | 2 | 11U1UU | ✓ | 110101 | |
| 4 | 111101 | → | 0 | 11U1U1 | ✓ | 110101 | PEMK |
| 5 | 111110 | → | 1 | 11U11U | — | 110101 | |

The algorithm for the Range Match search works in this case because of the following reasons:
  If the Coded Key is smaller than the MSMb, then the corresponding long Key Entry is larger than the Searched Key. This is because smaller Coded Keys correspond to PRKs where the bits that change are less significant than the MSMb.
  Similarly, if the Coded Key is larger than the MSMb, then the corresponding long Key Entry is still larger than the Searched Key. Thus, the larger Coded Key previous to the MSMb (denoted as GTMSMb) represents the smallest long Key Entry that is still larger than the Searched Key, so the long Key Entry preceding the GTMSMb is the Range Match Key (RMK).

It is noted that a as mentioned hereinabove, a long Key Entry with a Coded Key equal to the MSMb cannot be included in the database between the PEMK (found in step 1 above) and the Key Entry corresponding to the GTMSMb.

Maintenance of a Database with Coded Keys

Insertion of Key Entries and Coded Keys

The insertion of a submitted key in a list of Key Entries requires an additional insertion of the corresponding Coded Key and the possible update of this and the next Coded Key; all the preceding and succeeding Coded Keys remain unchanged Prior to the key insertion, the location of the inserted key in the Key list must be determined; one alternative is to perform a Range Match search procedure (where the Searched Key is larger than the Matched Key Entry) as previously described.

Table 7 shows an example of a Key Insertion procedure using PRKs. The insertion of 110000 involves the update of the corresponding Coded Key (to 4) and of the Coded Key of the next Key Entry (from 4 to 1); all the other Coded Keys remain unchanged.

TABLE 7

Example of Key Insertion Using PRKs

| List Before Insertion | | | | List After Insertion | | |
|---|---|---|---|---|---|---|
| Key Entry (543210) | Coded Key | PRK (543210) | Inserted Key | Key Entry (543210) | Coded Key | PRK (543210) |
| 100001 | 5 | 1UUUUU | | 100001 | 5 | 1UUUUU |
| 100010 | 1 | 1UUU1U | | 100010 | 1 | 1UUU1U |

TABLE 7-continued

Example of Key Insertion Using PRKs

| List Before Insertion | | | | List After Insertion | | |
|---|---|---|---|---|---|---|
| Key Entry (543210) | Coded Key | PRK (543210) | Inserted Key | Key Entry (543210) | Coded Key | PRK (543210) |
| 100101 | 2 | 1UU1UU | | 100101 | 2 | 1UU1UU |
| 110010 | 4 | 11UUUU | 110000 | 110000 | 4 | 11UUUU |
| 110101 | 2 | 11U1UU | | 110010 | 1 | 11UU1U |
| 110111 | 1 | 11U11U | | 110101 | 2 | 11U1UU |
| | | | | 110111 | 1 | 11U11U |

Removal of Key Entries and Coded Keys

The removal of a submitted key from a list of Key Entries requires an additional corresponding Coded Key and the possible update of the next Coded Key; all the preceding and succeeding Coded removal of the Keys remain unchanged. Prior to the key removal, the location of the key to be removed must be determined. One alternative is to perform an Exact Match search procedure as described hereinabove.

Table 8 shows an example of a Key Removal procedure using PRKs. The removal of 110010 involves the update of the Coded Key of the next Key Entry (from 2 to 4); all the other Coded Keys remain unchanged.

Updating of Key Entries and Coded Keys

The updating of the value of a Key Entry in a list (for instance by a Write operation) requires the updating of the corresponding Coded Key and of the next Coded Key; all the preceding and succeeding Coded Keys remain unchanged.

TABLE 8

Example of Key Removal Using PRKs

| | List Before Removal | | | List After Removal | |
|---|---|---|---|---|---|
| Key Entry (543210) | Coded Key | PRK (543210) | Removed Key | Key Entry (543210) | Coded Key | PRK (543210) |
| 100001 | 5 | 1UUUU | | 100001 | 5 | 1UUUU |
| 100010 | 1 | 1UUU1U | | 100010 | 1 | 1UUU1U |
| 100101 | 2 | 1UU1UU | | 100101 | 2 | 1UU1UU |
| 110010 | 4 | 11UUUU | 110010 | 110101 | 4 | 11UUUU |
| 110101 | 2 | 11U1UU | | 110111 | 1 | 11UU1U |
| 110111 | 1 | 11U11U | | | | |

Table 9 shows an example of a Key Update procedure using PRKs. The updating of 110010 to 101000 involves the updating of the corresponding Coded Key (from 4 to 3) and of the Coded Key of the next Key Entry (from 3 to 4); all the other Coded Keys remain unchanged.

TABLE 9

Example of Key Update Using PRKs

| | List Before Update | | | List After Update | |
|---|---|---|---|---|---|
| Key Entry (543210) | Coded Key | PRK (543210) | Updated Key | Key Entry (543210) | Coded Key | PRK (543210) |
| 100001 | 5 | 1UUUU | | 100001 | 5 | 1UUUU |
| 100010 | 1 | 1UUU1U | | 100010 | 1 | 1UUU1U |
| 100101 | 2 | 1UU1UU | | 100101 | 2 | 1UU1UU |
| 110010 | 4 | 11UUUU | 101000 | 101000 | 3 | 1U1UUU |
| 110101 | 2 | 11U1UU | | 110101 | 4 | 11UUUU |
| 110111 | 1 | 11U11U | | 110111 | 1 | 11UU1U |

Key Search in B-Tree Structures Using Coded Keys

Coded Keys can be applied to any type of search tree structures to significantly increase the search rate and reduce the search hardware. Among the varied search tree structures, the B-tree search procedures in a datalist are particularly efficient, because they use several nodes in each level, and many entries in each node. The retrieval of many entries per node reduces the number of access times to the database and reduces the number of tree levels, thereby speeding up the search process (for a specified capacity) or, alternatively, increasing the memory capacity for a specified search rate.

In the B-tree search process, the search interval in the list is repeatedly divided in any selected number of parts (in particular, two parts for binary tree, which is a special case of B-tree) according to the specific database structure, so that the matching entry can be found in fewer steps, assuming that all other system parameters are identical. Due to its significant advantages, it is preferable to use a B-tree whenever possible, in particular, balanced tree structures, where the tree has the same number of branches at every decision node and the same maximum number of steps is needed to access any database entry. The use of Coded Keys significantly enhances the B-tree search in hardware and software applications, because most of the search procedure is performed in the list of Coded Keys, which have a logarithmic length compared to the original key Entries. The B-tree can be used to perform searches for Exact or Range Match. The first step in a search is performed in the Coded Keys of the relevant node in each tree level to find the PEMK for this level; the original long Key Entries must be kept because in each stage of the B-tree search procedure the Searched Key is compared with the long Key Entry corresponding to the PEMK to check for a Range Match. The search then proceeds in the list of Coded Keys to find the Range Match; once found, the AD is retrieved, pointing to the relevant node in the succeeding level. The search procedure ends with the identification of either an Exact Match (when available) or a Range Match and the AD retrieval.

The search procedure may consist of identical steps, where each node has the same number of branches and each sequential search interval has the same number of entries, or may be combined, involving different number of branches and varied intervals in different steps. Also, it must be emphasized that while some of the processing operations in each search step are performed using Coded Keys, other processing operations may involve searching long Key Entries or other searching steps.

To assess the enhanced advantage of using Coded Keys in a B-tree search procedure, assume that the datalist consists of M w-bit words, but the processing logic allows simultaneous comparisons of up to only m words, or the bandwidth to the memory is allows the simultaneous retrieval of only m words. Then, up to m words having m·w bits can be accessed, retrieved and searched in each stage. The number of words or bits may vary in each stage of the B-tree, depending on the size of the database and the selected B-tree structure. If the same number of m words is searched in each stage, the comparison process takes s steps, where $s=\log_m M$; then s·m words or $B=s·m·w$ bits must be accessed, retrieved and compared in the search procedure. Thus, the bandwidth required for the bus connecting the memory device and the processing logic is proportional to $B=s·m·w$. When Coded Keys are used, each w-bit long word is coded into a short word having $c=\log_2 w$ bits. Then, using the same processing hardware, instead of retrieving and comparing m words with m·w bits in each stage, a larger number of Coded Keys (with $\log_2 w$ bits each) may be retrieved and searched together with one w-bit long word (PEMK) required for comparison with the Searched Key to check for an actual Exact or Range Match. The maximum number of Coded Keys that can be retrieved in each stage is:

$$n=(m-1)·(w/\log_2 M)$$

Thus, if the same bandwidth is maintained, a much larger number n of entries can be processed at each node, resulting in a total datalist size defined by:

$$M_c=n^s>>m^s=M,$$

which is significantly larger than the previous maximum supported datalist size.

Alternatively, if the (same) number of search stages is maintained while searching the same datalist, then only $(m·\log_2 w+m)$ bits are required for the search at each node. The requisite number of bits is significantly smaller than the m·w bits required by the conventional B-tree, hence, the search time is greatly decreased, and the search rate is appreciably increased.

If the same number of words M is maintained in the datalist, then, since (>>m) Coded Keys can be retrieved in each stage, a smaller number of stages, defined by $$s_c=\log_n M<\log_m M=s,$$

is required to complete the search procedure, increasing the search rate.

FIG. 1 shows a schematic example of a B-tree structure for a search procedure in a very small database that contains M=512 words, each having w=128 bits. If the same number of words m=8 is retrieved and searched in each stage, then the comparison process takes $s=\log_m M=\log_8 512=3$ steps. Thus, $s \cdot m = 3 \cdot 8 = 24$ words or $B = s \cdot m \cdot w = 24 \cdot 128 = 3072$ bits must be retrieved and compared in the search procedure.

Using the SMCK algorithm, each word is coded into a Coded Key having $c = \log_2 128 = 7$ bits. Consequently, instead of retrieving m=8 words with 8·128=1024 bits in each stage, the following maximum number of Coded Keys (plus one 128-bit PEMK) can be retrieved:

$$n=(m-1) \cdot w/\log_2 w = (8-1) \cdot 128/7 = 128 \text{ Coded Keys.}$$

Thus, the same bus bandwidth can be used to search a larger database containing up to $n \cdot n \cdot n = 128 \cdot 128 \cdot 128 = 2$ Mega Key Entries (instead of 512 key entries).

Alternatively, a smaller number of Coded Keys, down to the same number of Coded Keys as the original words (m=8) summing 8·7+128=184 bits (instead of 1024), can be retrieved in each stage. A smaller number of retrieved and processed bits per stage saves processing hardware and reduces the bus bandwidth requirements, such that cheaper memory devices can be used and/or higher search rates can be achieved, in any tradeoff that is suitable with respect to the search engine requirements.

Key Search and Maintenance in Two-Dimensional Arrays (TDAs) with Coded Keys

The methods presented previously for searching a submitted key in a list of Coded Keys using PRKs and for maintaining a list of Coded Keys can use Two-Dimensional Arrays (TDAs) based on the search and maintenance methods disclosed in pending U.S. Patent Applications assigned to HyWire, Ltd.: RAM-Based Binary CAM (Ser. No. 10/229,054) dealing with binary integers and RAM-Based RCAM (Ser. No. 10/229,065) used for range integers, both of which are incorporated by reference as if fully set forth herein. A sequential search of the submitted key in the TDAs presented in these patent applications can be completed in two main steps, one for each TDA dimension, where the first step involves a Range Match search in a First Column Register (FC-Register).

The use of Coded Keys for searching a TDA requires a previous generation of these Coded Keys from the corresponding Key Entries and their storage in an additional reduced TDA. The original TDA must be kept, because in each search procedure the Searched Key is compared with the matching long Key Entry corresponding to the PEMK to check for an actual Exact or actual Range Match. Similarly, to use an FC-Register composed of Coded Keys, the Coded Keys must be generated from the Key Entries of the original FC-Register, apart from the TDA, and stored in a separate FC-Register. Alternatively, the first step in the search procedure can be performed using the original FC-Register, in which case, there is no need to generate Coded Keys for the FC-Register.

The Key search and maintenance procedures in the TDAs listed below present the Coded Keys only (and omit the PRKs). The Exact and Range Match search algorithms, respectively, are extensions of the algorithms presented hereinabove. Similarly, the maintenance procedures are extensions of those previously described herein.

In either search or maintenance procedure, each TDA row is handled as a separate one-dimensional array. The Coded Keys are generated separately for each row; the Coded Key corresponding to the first Key Entry in each row is generated by comparison with reference value. For simplicity, a common reference value of "all zeros" is used for all the rows. The Coded Keys corresponding to the Key Entries listed in the FC-Register are generated apart from the TDA by comparing each long Key Entry to the previous Key Entry in the FC-Register. Only the first Coded Key, corresponding to the first Key Entry in the first TDA row, is identical to the first Coded Key in the TDA.

Table 10 shows an example of a TDA and the corresponding FC-Register, used below for Exact and Range Match lookups, and for Insertion of 0101101 (=45), and also for the Removal of 0101100 (=44). For clarity, each entry in the TDA and the FC-Register includes the decimal and binary values of the long key entry and then the corresponding Coded Key. The first Coded Key in TDA each row is generated in reference to 0000000. The Coded Keys listed in the FC-Register (except the first Coded Key) are generated apart from the TDA by comparing each long Key Entry with the previous long Key Entry.

TABLE 10

Example of Coded Keys in a TDA and the Corresponding FC-Register

| FC-Register | Key Index | 0 | 1 | 2 | 3 | 4 | 5 | 6 | 7 |
|---|---|---|---|---|---|---|---|---|---|
| 2 0000010 1 | 0 | 2 0000010 1 | 4 0000100 2 | 6 0000110 1 | 8 0001000 3 | 10 0001010 1 | 12 0001100 2 | 14 0001110 1 | 16 0010000 4 |
| 18 0010010 4 | 1 | 18 0010010 4 | 20 0010100 2 | 22 0010110 1 | 24 0011000 3 | 26 0011010 1 | 28 0011100 2 | 30 0011110 1 | 32 0100000 5 |
| 34 0100010 5 | 2 | 34 0100010 5 | 36 0100100 2 | 38 0100110 1 | 40 0101000 3 | 42 0101010 1 | 44 0101100 2 | 46 0101110 1 | 48 0110000 4 |
| 50 0110010 4 | 3 | 50 0110010 5 | 52 0110100 2 | 54 0110110 1 | 56 0111000 3 | 58 0111010 1 | 60 0111100 2 | 62 0111110 1 | 64 1000000 6 |
| 66 1000010 6 | 4 | 66 1000010 6 | 68 1000100 2 | 70 1000110 1 | 72 1001000 3 | 74 1001010 1 | 76 1001100 2 | 78 1001110 1 | 80 1010000 4 |

Key Search Using Coded Keys in TDAs

The two main steps in a sequential search of the submitted key in a TDA using Coded Keys are:

Step 1: This step is identical for Exact and Range Match lookups, and involves a Range Match search of the Searched Key in the FC-Register. The Range Match Key (RMK) resulting from this search points to the TDA row where the key entry may be located. In this example, the Range Match search of the Searched Key=0101101 the key insertion, the location of the inserted key in the TDA must be determined; one alternative is to perform a Range Match search procedure as described hereinabove.

Table 11 demonstrates the effect of inserting the submitted key 0101101 (=45) in the TDA and the FC-Register shown in Table 10. The last Key Entries of row #2 and the succeeding rows of the TDA shown in Table 10 appear as first Key Entries in the TDA and in the FC-Register of Table 11. The new Coded Key values (sometimes unchanged) are shadowed in the TDA and the FC-Register.

TABLE 11

Example of a TDA after Key Insertion

| FC-Register | Key Index | 0 | 1 | 2 | 3 | 4 | 5 | 6 | 7 |
|---|---|---|---|---|---|---|---|---|---|
| 2 0000010 1 | 0 | 2 0000010 1 | 4 0000100 2 | 6 0000110 1 | 8 0001000 3 | 10 0001010 1 | 12 0001100 2 | 14 0001110 1 | 16 0010000 4 |
| 18 0010010 4 | 1 | 18 0010010 4 | 20 0010100 2 | 22 0010110 1 | 24 0011000 3 | 26 0011010 1 | 28 0011100 2 | 30 0011110 1 | 32 0100000 5 |
| 34 0100010 5 | 2 | 34 0100010 5 | 36 0100100 2 | 38 0100110 1 | 40 0101000 3 | 42 0101010 1 | 44 0101100 2 | 45 0101101 0 | 46 0101110 1 |
| 48 0110000 4 | 3 | 48 0110000 5 | 50 0110010 1 | 52 0110100 2 | 54 0110110 1 | 56 0111000 3 | 58 0111010 1 | 60 0111100 2 | 62 0111110 1 |
| 64 1000000 6 | 4 | 64 1000000 6 | 66 1000010 1 | 68 1000100 2 | 70 1000110 1 | 72 1001000 3 | 74 1001010 1 | 76 1001100 2 | 78 1001110 1 |
| 80 1010000 4 | 5 | 80 1010000 6 | | | | | | | |

(=45) in the FC-Register yields RMK=0100010 (=34), which points to the third TDA row (indexed 2).

Step 2: In this step, the Searched Key is looked up in row #2 identified in Step 1. This step differs for Exact and Range Match lookups. An Exact Match search procedure is performed as previously described, yielding a Potential Exact Match Key (PEMK), which may correspond to an exact matching long Key Entry (if included in the TDA). In this example, 0101101 is not included in the TDA and the search yields a No Exact Match result. A Range Match search proceeds as previously described, where the Searched Key is larger than the Key Entry; and may yield an RMK, which is the matching long Key Entry. In this case, the search result is RMK=0101100 (=44).

Maintenance of Key Entries and Coded Keys in TDAs

The insertion of a submitted key in a TDA row requires an additional insertion of the corresponding Coded Key and the possible update of this and the next Coded Key; all the preceding and succeeding Coded Keys in the same row remain unchanged. If the TDA rows are full, then all the Key Entries after the inserted one are shifted forward. The last Key Entry and the corresponding Coded Key of this row (and the succeeding rows) are shifted to the next row; the shifted Coded Key, being the first in the row, is generated by comparison with the reference (usually "all zeros") value and generally changes together with the contiguous Coded Key and must be updated. The last Key Entries shifted forward to the next rows replace the previous first Key Entries in the FC-Register. Since the Coded Keys of the FC-Register are generated by comparing each long Key Entry to the previous Key Entry in the FC-Register, then the Coded Keys corresponding to the shifted Key Entries change and must also be updated. Prior to The removal of a submitted key from a TDA row requires an additional removal of the corresponding Coded Key and the possible update of the next Coded Key; all the preceding and succeeding Coded Keys in the same row remain unchanged. If the TDA rows are to remain full, then all the Key Entries after the removed one are shifted backward. The first Key Entry and the corresponding Coded Key of the next row (and the succeeding rows) are shifted back to the last position of the previous row; these shifted Coded Keys are generated by comparison with the preceding Coded Keys and must be updated. The Coded Keys corresponding to the Key Entries shifted backward to the first position in the rows succeeding the removed Key Entry are generated by comparison with the reference (usually "all zeros") value; they generally change and must also be updated. These Key Entries shifted backward to the first position replace the previous first Key Entries in the FC-Register. Since the Coded Keys of the FC-Register are generated by comparing each long Key Entry to the previous Key Entry in the FC-Register, then the Coded Keys corresponding to the shifted Key Entries change and must be updated. Prior to the key removal, the location of the key to be removed from the TDA must be determined; one alternative is to perform an Exact Match search procedure as described hereinabove.

Table 12 demonstrates the effect of removing the submitted key 0101100 (=44) from the TDA and the FC-Register shown in Table 10. The first Key Entries of the rows succeeding row #2 shown in Table 10 appear as last Key Entries in the preceding rows of the TDA. Also, the second Key Entries of row #2 and the succeeding rows of the TDA shown in Table 10 appear as first Key Entries in the TDA and in the FC-Register of Table 12. The new Coded Key values (sometimes unchanged) are shadowed in the TDA and the FC-Register.

The insertion and removal of entries in the TDAs, as presented above, are lengthy operations, because these entries are stored in contiguous ascending order, with no empty TDA cells in between. The contiguity of entries in the TDA requires a forward/backward shift of all the entries positioned after the inserted/removed entry. Alternative flexible storage schemes may be applied to allow faster Insert and Remove operations, for example using Row Index entries associated with Key Entries in the FC-Register that point to the physical TDA rows. These row index pointers may determine the row ordering, which is no longer required to be monotonic. A newly inserted entry may be placed in a new row or in an empty cell of the row containing the keys with the nearest value; an entry that is removed from a row may leave an empty cell. Since the Coded Keys are generated by comparing each long Key Entry to the previous Key Entry, the Coded Keys involved in the insert and remove operations must be updated according to the same principles used in the examples described above and shown in Tables 11 and 12.

g; however, when searching for an extended G-RAM row, only the FC-Register is needed.

In Multi-Hierarchy Architecture, the FC-Register of a Single or Multi-RAM CAM is partitioned in hierarchical blocks according to a numerical system of base B. A general hierachical structure consists of k hierarchical blocks, a $B^{k-1}$ Register and (k−1) RAMs, $B^{k-2}$ RAM to $B^0$ RAM.

Figure 2:
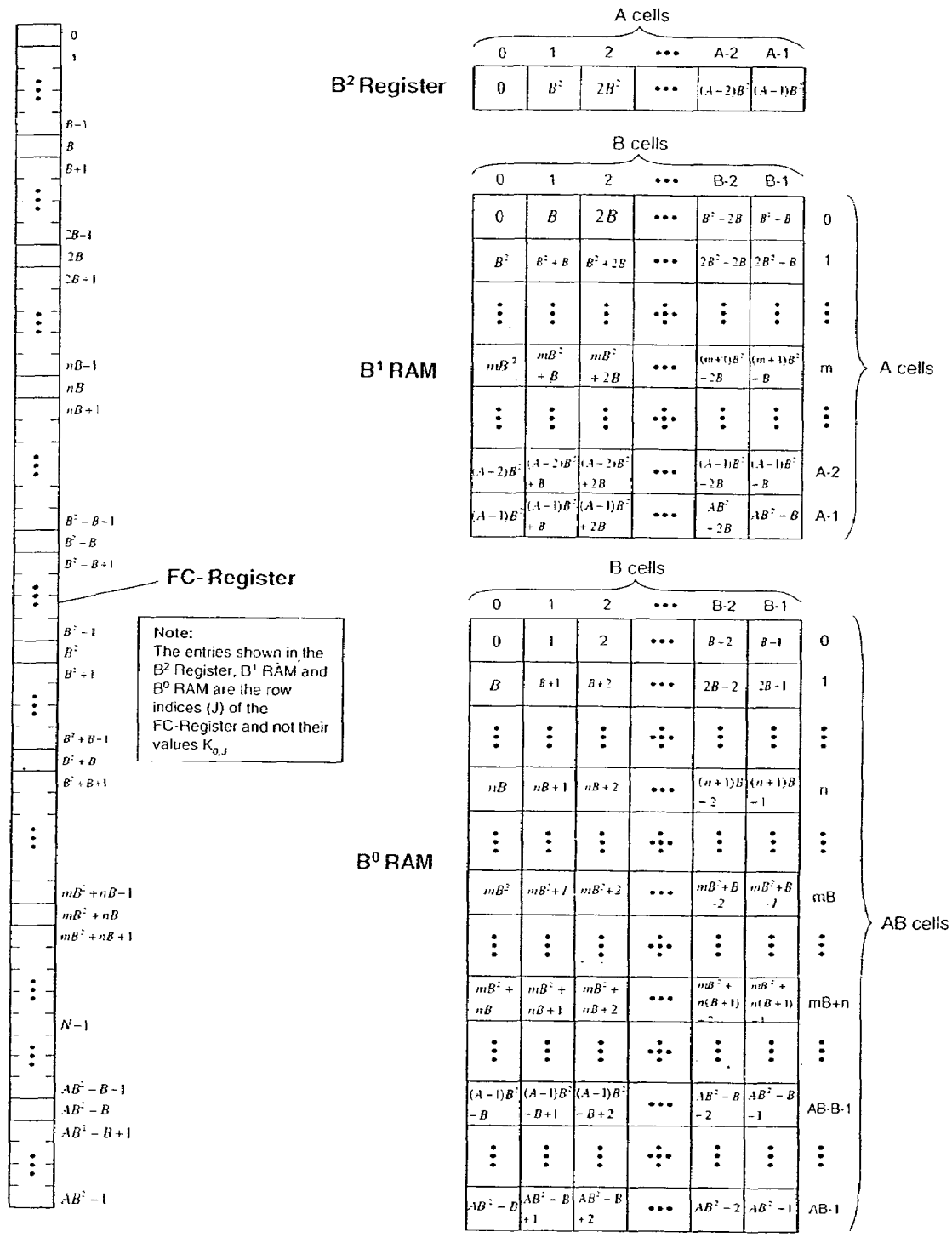
FIG. 2 shows an example of partitioning of the first column (FC) Register into three hierarchical blocks, $B^2$ Register, $B^1$ RAM and $B^0$ RAM.

FIG. 2 shows an example of partitioning of the FC-Register into three hierarchical blocks, $B^2$ Register, $B^1$ RAM and $B^0$ RAM, similar to the FC-RAM partitioning presented in U.S. patent application Ser. No. 10/206,189. The FC-Register first column contains $AB^2$ key entries, wherein the number A is selected to meet the condition $AB^2 \geq N$, such that the three storing devices contain all the first column entries. If $AB^2 > N$, some of the last entries of the $B^0$ RAM remain empty. It should be noted that the entries shown in the $B^2$ Register, $B^1$ RAM and $B^0$ RAM in FIG. 2 are the row indices (J) of the FC-Register entries and not their values $K_{0,J}$.

TABLE 12

Example of a TDA after Key Removal

| FC-Register | Key Index | 0 | 1 | 2 | 3 | 4 | 5 | 6 | 7 |
|---|---|---|---|---|---|---|---|---|---|
| 2<br>0000010<br>1 | 0 | 2<br>0000010<br>1 | 4<br>0000100<br>2 | 6<br>0000110<br>1 | 8<br>0001000<br>3 | 10<br>0001010<br>1 | 12<br>0001100<br>2 | 14<br>0001110<br>1 | 16<br>0010000<br>4 |
| 18<br>0010010<br>4 | 1 | 18<br>0010010<br>4 | 20<br>0010100<br>2 | 22<br>0010110<br>1 | 24<br>0011000<br>3 | 26<br>0011010<br>1 | 28<br>0011100<br>2 | 30<br>0011110<br>1 | 32<br>0100000<br>5 |
| 34<br>0100010<br>5 | 2 | 34<br>0100010<br>5 | 36<br>0100100<br>2 | 38<br>0100110<br>1 | 40<br>0101000<br>3 | 42<br>0101010<br>1 | 46<br>0101110<br>2 | 48<br>0110000<br>4 | 50<br>0110010<br>1 |
| 52<br>0110100<br>4 | 3 | 52<br>0110100<br>5 | 54<br>0110110<br>1 | 56<br>0111000<br>3 | 58<br>0111010<br>1 | 60<br>0111100<br>2 | 62<br>0111110<br>1 | 64<br>1000000<br>6 | 66<br>1000010<br>1 |
| 68<br>1000100<br>6 | 4 | 68<br>1000100<br>6 | 70<br>1000110<br>1 | 72<br>1001000<br>3 | 74<br>1001010<br>1 | 76<br>1001100<br>2 | 78<br>1001110<br>1 | 80<br>1010000<br>4 | |

Updating of Key Entries and Coded Keys in TDAs

The updating of the value of a Key Entry in a TDA (e.g., by a Write operation) requires the updating of the corresponding Coded Key and of the next Coded Key; all the preceding and succeeding Coded Keys remain unchanged. The Key Entries and Coded Keys of the FC-Register must be updated only if the first Key Entries in the TDA rows are changed.

Key Search and Maintenance Using Coded Keys in Multi-Hierarchy Architecture

The concept of Multi-Hierarchy Architecture was disclosed in a pending patent application on Multi-RAM Binary CAM or RCAM (U.S. patent application Ser. No. 10/206,189, which is incorporated by reference as if fully set forth herein). A Multi-RAM CAM includes an ordered group of G RAMs, regarded as an "extended RAM" and denoted as G-RAM. The discussion herein is limited to the case in which the key entries are stored in contiguous ascending order along the "extended rows" of the G-RAM.

The first columns of the multiple RAMs composing the G-RAM can be arranged in sequential columns in an integrated First Column RAM (FC-RAM) having N rows and, G columns. A generic column g of the FC-RAM contains the first column entries of RAM # g in the G-RAM. The first column of the FC-RAM (i.e., FC-Register) contains the same entries as the first column of RAM #0. The advantage of the FC-RAM is that it points to a specific row of a specific RAM The partitioning process is performed in recursive mappings of a one-dimensional first column array into RAMs with the same entries. In the first mapping, the FC-Register first column is mapped into a RAM (denoted as $B^0$ RAM) with AB rows and B columns, so that all the entries whose row indices are multiples of B are arranged in its first column; $B^0$ RAM may be stored without its first column to save storage space. This first column is mapped into the next-hierarchy block (denoted as $B^1$ RAM) with A rows and B columns, such that all the entries whose row indices are multiples of $B^2$ are arranged in its first column. These first column entries are stored in the next-hierarchy block (highest-hierarchy block in this case), which is a one-dimensional register with A cells, denoted herein as $B^2$ Register.

Thus, the $B^2$ Register contains all the first column entries whose row indices are multiples of $B^2$, i.e., $K_{0,J}$, where $J=mB^2$, $0 \leq m \leq A-1$. The $B^1$ RAM has A rows and B columns, and stores all the entries whose row indices are multiples of B, i.e., $K_{0,J}$, where $J=nB$, $0 \leq n \leq AB-1$. The lowest-hierarchy block $B^0$ RAM stores all the entries of the FC-Register in AB rows and B columns. As in the FC-Register, any of the last entries of the $B^2$ Register, $B^1$ RAM and $B^0$ RAM remain empty.

In general, when the FC-Register first column is large and is partitioned in k hierarchical blocks, the serial search procedure consists of k+2 steps. The increasing number of hierarchical blocks reduces the chip size but adds latency, because the number of steps in a serial search procedure is increased. However, these k+2 steps can be performed in a pipelined procedure to achieve a high throughput.

A key search in the Single or Multi-RAM CAM starts with a search in the hierarchical blocks, specifically in the highest-hierarchy block, the $B^{k-1}$ Register, using a Row Locator to locate the largest key entry that is smaller than (or equal to) the submitted key; this key entry points to a specific row in the next-hierarchy block, the $B^{k-2}$ RAM. Then, the submitted key is searched in the specific row of this RAM using a Column Locator to locate the largest key entry that is smaller than (or equal to) the submitted key; this points to a specific row in the $B^{k-3}$ RAM. Similar search procedures are then performed in the subsequent hierarchical blocks down to the $B^0$ RAM. The matching key entry in this last RAM points to a specific FC-Register entry and a TDA row (in case of a single RAM). In the case of multiple RAMs, the FC-Register entry points to an FC-RAM row (if used) and to an extended G-RAM row; the FC-RAM row may be looked up to find the specific RAM containing the matching key entry in the identified row.

In the 3-level hierarchy shown by way of example in FIG. 2, the key search starts in the $B^2$ Register, to locate the largest key entry that is smaller than (or equal to) the submitted key; this key entry points to a specific row in the $B^1$ RAM. Then, the submitted key is searched in the specific row of this RAM to locate the largest key entry that is smaller than (or equal to) the submitted key; this points to a specific row in the $B^0$ RAM. A similar search procedure is then performed in the $B^0$ RAM. The matching key entry in this RAM points to a specific FC-Register entry and a TDA row (in case of a single RAM) or an extended G-RAM row (in case of multiple RAMs). Then, the submitted key is searched in this row to find an exact match (for a Binary CAM) or a range match (for an RCAM).

A key insertion or removal in the TDA starts with a search in the hierarchical blocks, following an identical procedure to that used for lookups, described above. This search points to a specific FC-Register entry and TDA row. Then, the search proceeds in this TDA row, to determine whether the key exactly matches a key entry. In the case of an exact match, the submitted key can be removed but not inserted; otherwise, the submitted key can be inserted after the largest key entry that is smaller than this key.

Storage of Key Entries and Coded Keys in Multi-Hierarchy Architecture

The SMCK algorithm disclosed herein can be efficiently applied to an ASE operating with external memories (disclosed in a pending U.S. Patent Application assigned to HyWire, Ltd., entitled "Multi-Dimensional Associative Search Engine Having An External Memory", which is incorporated by reference for all purposes as if fully set forth herein) in Single-RAM or Multi-RAM Multi-Hierarchy Architecture. In this configuration, the long Key Entries stored in the external Multi-RAMs are transformed into short Key Entries to generate a reduced database. Then, the long Key Entries of the FC-Register and the hierarchical blocks thereof can also be transformed to generate a reduced FC-Register and reduced hierarchical blocks. The physical location of original (long Key Entries) and the transformed FC-Register and the hierarchical blocks thereof must be determined according to the size of the original database and the requirements of the Search Engine Manager (SEM) and the external memories. One alternative is to locate the reduced FC-Register and hierarchical blocks thereof in the SEM, and the original FC-Register and its hierarchical blocks in the external RAMs. Other alternatives involve the location of only part of the reduced higher hierarchical blocks (and maybe one or more original higher hierarchical blocks) in the SEM.

Figure 3:
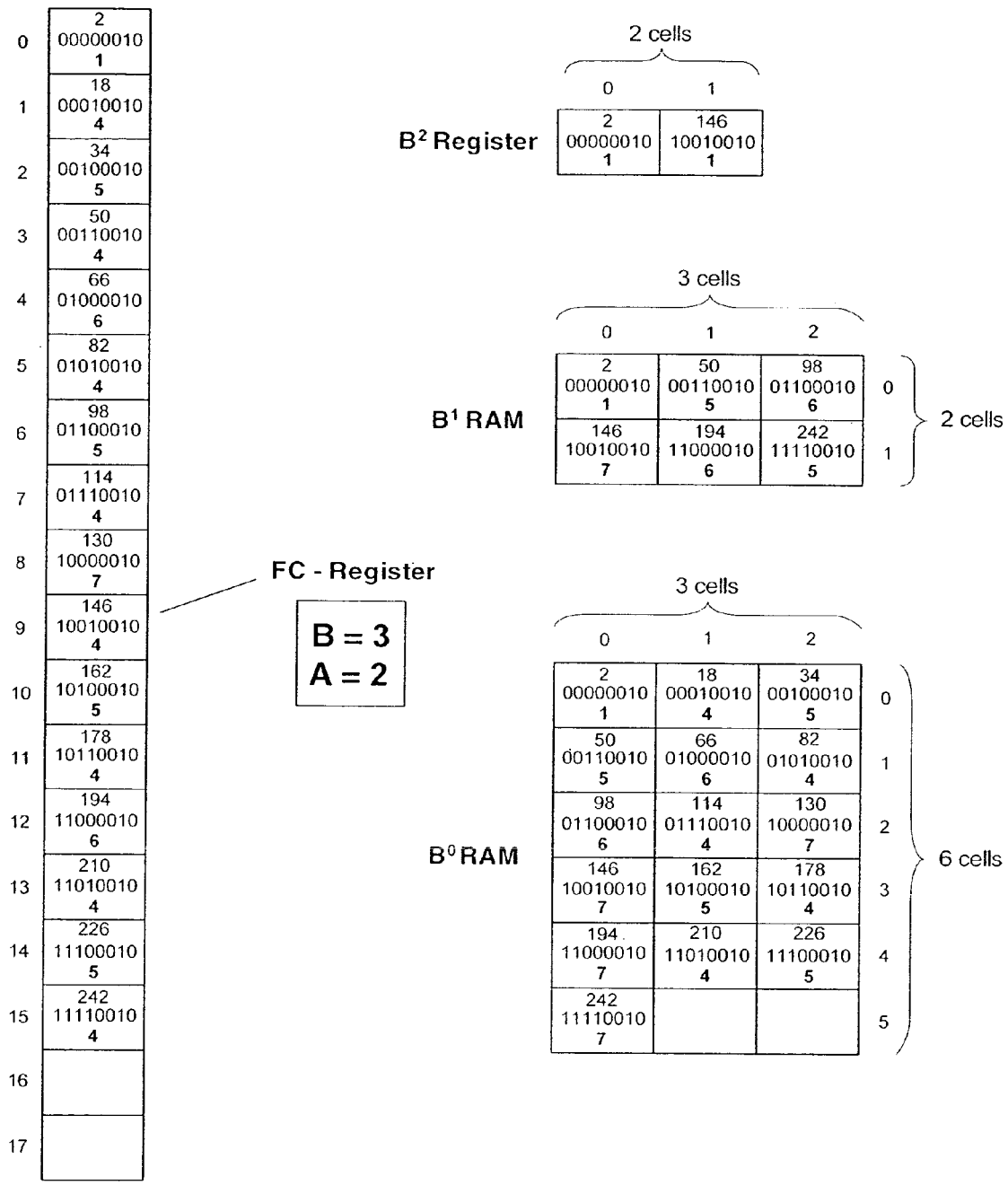
FIG. 3 shows a particular case of the example of an FC-Register partitioned into three hierarchical blocks, as depicted in FIG. 2.

FIG. 3 shows an example of an FC-Register partitioned into three hierarchical blocks: $B^2$ Register, $B^1$ RAM and $B^0$ RAM (depicted in FIG. 2). In this example, the FC-Register has 15 entries and the numerical base for the partition is 3 (B=3, A=2). Each entry in the FC-Register includes the decimal and binary values of the long key entry and then the corresponding Coded Key, as in Table 10 above. The FC-Register corresponds to a single TDA, similar but much larger to the one exemplified in Table 10. The Coded Keys listed in the FC-Register (except the first) are generated apart from the TDA by comparing each long Key Entry with the previous long Key Entry. The first Coded Keys in the rows of the three hierarchical blocks are generated in reference to 00000000.

Key Search Using Coded Keys in Multi-Hierarchy Architecture

The key search procedure for a single TDA (not shown) with an FC-Register partitioned into three hierarchical blocks starts with a search in the $B^2$ Register, to locate the largest key entry that is smaller than (or equal to) the submitted key; this key entry points to a specific row in the $B^1$ RAM. Then, the submitted key is searched in the specific row of this RAM to locate the largest key entry that is smaller than (or equal to) the submitted key; this points to a specific row in the $B^0$ RAM. A similar search procedure is then performed in the $B^0$ RAM. The matching key entry in this RAM points to a specific FC-Register entry and a TDA row. Then, the submitted key is searched in this row to find an exact match (for a Binary CAM) or a range match (for an RCAM).

All the steps in the search procedure, except the last one, are identical for exact and range match lookups and involve Range Match searches (where the searched key is larger than the matched key entry). When Coded Keys are used, each of these search steps yields a Range Match Key (RMK), as previously described. The final step results in a Potential Exact Match Key (PEMK), which may correspond to an exact matching long Key Entry (if included in the TDA), or to an RMK, in the case of a range match.

Another exemplary search procedure is described herein-below, with reference to FIG. 3. The searched key is 00110111 (=55). The search steps are described below assuming that they are performed using Coded Keys.

The first step is performed in the $B^2$ Register. It yields RMK=00000010 (=2), which points to the first row (indexed 0) of the $B^1$ RAM. The second step, performed in the $B^1$ RAM, results in RMK=00110010 (=50), which points to the second row (#1) of the $B^0$ RAM. The third step yields again RMK=00110010 (=50), pointing to the fourth entry (#3) of the FC-Register. The last step is performed in the fourth TDA row. Assume that the TDA shown in Table 10 is part of the TDA being searched so that this step is performed in the fourth row of this TDA. An Exact Match search yields a No Exact Match result because 00110111 is not included in the TDA. A Range Match search yields RMK=00110110 (=54).

Maintenance of Key Entries and Coded Keys in Multi-Hierarchy Architecture

Insertion of Key Entries and Coded Keys in Multi-Hierarchy Architecture

The insertion of a submitted key in a TDA row requires an additional insertion of the corresponding Coded Key and the possible update of this and several other Coded Keys in the TDA, as described herein and as shown in Table 11. The possibly updated Coded Keys are the added Coded Key and the Coded Key following thereafter. For the TDA rows to remain full, all the Key Entries after the inserted one are shifted forward; consequently, the first Coded Keys together with the contiguous Coded Keys in the rows succeeding the inserted Key Entry generally change and must be updated. Also, the Coded Keys of the FC-Register corresponding to the shifted Key Entries change and must be updated. The updated Coded Keys of the FC-Register generate subsequent an updating of Coded Keys in all the hierarchical blocks of the FC-Register. These updates are similar to those performed in the TDA.

Removal of Key Entries and Coded Keys in Multi-Hierarchy Architecture

The removal of a submitted key from a TDA row requires an additional removal of the corresponding Coded Key and the possible update of several Coded Keys in the TDA, as described herein and as shown in Table 12. First, the Coded Key following the removed one is possibly updated. For the TDA rows to remain full, all the Key Entries after the removed one are shifted backward; consequently, the first and last Coded Keys after the removed Key Entry generally change and must be updated. Also, the Coded Keys of the FC-Register corresponding to the shifted Key Entries change and must be updated. The updated Coded Keys of the FC-Register generate subsequent update of Coded Keys in all the hierarchical blocks. These updates are similar to those performed in the TDA.

Updating of Key Entries and Coded Keys in Multi-Hierarchy Architecture

The updating of the value of a Key Entry in a TDA (e.g., by a Write operation) requires the updating of the corresponding Coded Key and of the next Coded Key; all of the preceding and succeeding Coded Keys remain unchanged. The Key Entries and Coded Keys of the FC-Register must be updated only if the first Key Entries in the TDA rows are changed. The updated Coded Keys of the FC-Register generate subsequent update of Coded Keys in all the hierarchical blocks.

Pipelined Search Operation Using Coded Keys

In the methods presented hereinabove for searching a submitted key in a list of Coded Keys for exact and range integers using PRKs, the first step of the search algorithm relates to analyzing the list of Coded Keys and finding a PEMK and the second step relates to finding an Exact Match (if available) or an RMK. These methods provide a characteristic deterministic search time that is independent of the specific content of the key entries, such that a pipelined search can be utilized. Such a pipelined search, in which a new search cycle starts during the performance of the previous search cycle, enables ongoing parallel search operations and provides a significant increase in high throughput with respect to non-pipelined operations.

Proof of the SMCK Algorithms

Without limiting the generality of the proofs provided hereinbelow, it is assumed that a "zero" Key is not included in the database.

Coded Key Definition

Assume a finite list of M integer Keys: $K_0, K_1, \ldots, K_{M-1}$. The key list is arranged in ascending order: $K_0 < K_1 < \ldots < K_{M-1}$ (there are no two identical numbers in the list).

Each Key $K_i$ consists of N bits and can be presented in the following binary notation:

$$K_i = k^i_{N-1} k^i_{N-2} \ldots k^i_1 k^i_0, \text{ where } 0 \leq i \leq M-1.$$

A Coded Key $CK_i$ is generated for each Key $K_i$ in the following way:

Generate $CK_0$:

Assume that $k^0_j$ is the Most Significant Bit (MSB) that is equal to 1. Then $CK_0 = j$.

Generate $CK_i$:

Compare the key $K_i$ bit by bit (from MSB to LSB) with the previous key in the list, $K_{i-1}$:

$$K_i = k^i_{N-1} k^i_{N-2} \ldots k^i_1 k^i_0$$

$$K_{i-1} = k^{i-1}_{N-1} k^{i-1}_{N-2} \ldots k^{i-1}_1 k^{i-1}_0$$

Suppose that the bits with index j are the first (most significant) ones to be different, i.e., $$k^i_m = k^{i-1}_n \text{ for } N-1 \geq n > j$$

$$k^i_j \neq k^{i-1}_j$$

Then $CK_i = j$.

Theorem 1 (based on the $CK_i$ generation procedure): If $CK_i = j$ (i>0), then $k^i_j = 1$ and $k^{i-1}_j = 0$. This is because $K_i > K_{i-1}$.

A Searched Key (SK) has the same length (number of bits) as the Keys in the key list.

$$SK = sk_{N-1} sk_{N-2} \ldots sk_1 sk_0$$

Exact Search

Problem Definition

Find the index i of the key $K_i$ in the list that is equal to SK. The key $K_i$ is denoted as Exact Match Key. If no key in the list is equal to SK, then the search result is "Key Not Found".

Exact Search Algorithm

The algorithm for Exact Match search consists of two main steps:

Step 1

1a. For each Coded Key $CK_i$, generate an N-bit number $PK_i = pk^i_{N-1} pk^i_{N-2} \ldots pk^i_1 pk^i_0$, denoted as Partially Reconstructed Key (PRK). The PRK is generated as follows:

Generate $PK_0$:

Define that all the bits of $PK_0$ are equal to 0 except the bit with index equal to $CK_0$.

This means:

For each $j=0 \ldots N-1$, where $j \neq CK_0$: $pk^0_j = 0$

For $j = CK_0$: $pk^0_j = 1$

Generate $PK_i$:

All the bits of $PK_i$ with indices greater than $CK_i$ are equal to the corresponding bits of $PK_{i-1}$. The bit with index $CK_i$ is equal to 1. All the other less significant bits are equal to 0 and represent unknown values (denoted by "U" in previous tables). This means:

For each $j > CK_i$: $pk^i_j = pk^{i-1}_j$

For $j = CK_i$: $pk^i_j = 1$

For each $j < CK_i$: $pk^i_j = 0$ (unknown value)

1b. Compare each of the M PRKs, $PK_i$, where $0 \leq i \leq M-1$, with SK, in order to generate a "Validity bit", denoted as $b_i$. This bit is generated as follows:

Generate $b_i$ for each $PK_i$:
 Compare $sk_j$ with $pk^i_j$ for each bit $j$ ($0 \leq j \leq M-1$)
 If $pk^i_j=1$ and $sk_j=0$ for any $j$, then $b_i$=not_valid.
 If no $j$ is found where $pk^i_j=1$ and $sk_j=0$, then $b_i$=valid.

1c. Search the list of bits $b_0, b_1, \ldots, b_{M-1}$, starting from $b_{M-1}$ toward $b_0$, to find the first value $b_i$ (corresponding to the largest $PK_i$) that is valid. This means, finding $b_i$, where $b_i$=valid, and $b_m$=not_valid for $M-1 \geq m > i$. The index i is denoted as "i_valid" and corresponds to the PEMK ($K_{i\_valid}$=PEMK).
 If all these bits are valid, then i_valid=M-1.
 If all the bits are not_valid, then there is no key in the list that is equal to SK (case 3), the search result of this step is "Exact Match Not Found", and the search algorithm is over.

Step 2

If $b_{i\_valid}$ is found, then compare the corresponding key $K_{i\_valid}$ with SK:
 If SK=$K_{i\_valid}$ (case 1), then matching index=i_valid.
 If SK≠$K_{i\_valid}$ (case 2), then the search result is "Exact Match Not Found".

Proof of the Exact Search Algorithm

Theorem 2 (based on Theorem 1): Given a PRK $PK_i$, for each index $j$, where $pk^i_j=1$, there is a corresponding $k^i_j=1$ (in the Key $K_i$).

Theorem 3 (based on Theorem 2): If $b_i$ is not valid and $CK_i$=J, then there must be at least one index $j$, $j \geq J$, such that $k^i_j=1$ and $sk_j=0$.

Theorem 4: If SK is equal to a key $K_i$ in the list, then its $b_i$ is valid.

Proof: $b_i$ is not valid only if there is a bit in SK that is 0, whereas the corresponding bit in $PK_i$ is 1. But, according to Theorem 2, $PK_i$ has 1's only at indexes where $K_i$ also has 1's. Since SK is equal to $K_i$, then, at each index where $PK_i$ has 1, SK also has 1; thus, $PK_i$ has a valid $b_i$.

Step 2 in the algorithm, which yields the search result, defines different actions in three different cases. We prove the algorithm for each of these cases separately.

Case 1: SK=$K_{i\_valid}$

If SK=$K_{i\_valid}$, then $K_{i\_valid}$ is the Searched Key, so matching index=i_valid.

Case 2: SK≠$K_{i\_valid}$

If SK≠$K_{i\_valid}$ then there are two options: SK>$K_{i\_valid}$ or SK<$K_{i\_valid}$.

If SK>$K_{i\_valid}$ then:
 Suppose that there is a key in the list, denoted as $K_{eql}$, which is equal to SK. This key must be greater than $K_{i\_valid}$, i.e., eql>i_valid. According to Theorem 4, if $K_{eql}$ is equal to SK, then its $b_{eql}$ is valid. But, all $b_i$ for i>i_valid are not valid. We reached a contradiction, meaning that if SK>$K_{i\_valid}$, then there is no key in the list which is equal to SK.

If SK<$K_{i\_valid}$ then:
 Suppose there is a key in the list, $K_{eql}$, which is equal to SK. This key must be smaller than $K_{i\_valid}$, i.e., eql<i_valid.
 Compare SK with $K_{i\_valid}$ bit by bit from MSB to LSB. Assume that MSMb is the first bit index where $sk_{MSMb} \neq k^{i\_valid}_{MSMb}$, i.e., For j>MSMb, $sk_j = k^{i\_valid}_j$, For j=MSMb, $sk_{MSMb}=0$, $k^{i\_valid}_{MSMb}=1$ because SK<$K_{i\_valid}$.

If SK=$K_{eql}$ then:

For j>MSMb, $sk_j = k^{eql}_j$,

For j=MSMb, $sk_{MSMb}=0$, $k^{eql}_{MSMb}=0$.

Therefore:

For j>MSMb, $sk_j = k^{eql}_j$ and also $sk_j = k^{i\_valid}_j$.

Since the list is arranged in ascending order, then for j>MSMb, $k^{eql}_j = k^{eql+1}_j = \ldots = k^{i\_valid}_j$.

We know that $k^{eql}_{MSMb}=0$ and $k^{i\_valid}_{MSMb}=1$; thus, there is some key $K_{i\_chg}$, eql+1 $\leq$ i_chg $\leq$ i_valid, where $k^{i\_chg-1}_{MSMb}=0$ and $k^{i\_chg}_{MSMb}=1$. For this key, $CK_{i\_chg}$=MSMb, because this is the MSB that changes (all the more significant bits with indexes higher than MSMb are the same for all keys between $K_{eql}$ and $K_{i\_valid}$).

For j>MSMb, $k^{i\_chg}_j = k^{i\_chg+1}_j = \ldots = k^{i\_valid}_j$,

For j=MSMb, $k^{i\_chg-1}_{MSMb}=0$, $k^{i\_chg}_{MSMb} = k^{i\_chg+1}_{MSMb} = \ldots = k^{i\_valid}_{MSMb}=1$.

Therefore:

$CK_{i\_chg}$=MSMb, so $pk^{i\_chg}_{MSMb}=1$

For i_chg<i $\leq$ i_valid, $CK_i$<MSMb, so $pk^i_{MSMb}=1$.

We proved that $pk^{i\_valid}_{MSMb}=1$. But $sk_{MSMb}=0$. This means that $b_{i\_valid}$=not_valid. But we started from the assumption that $b_{i\_valid}$=valid. Thus, a contradiction has been reached, meaning that if SK<$K_{i\_valid}$, then there is no key in the list that equals SK.

Case 3: Valid Bit Not Found

According to Theorem 4, if SK is equal to a key $K_i$ in the list, then its $b_i$ is valid. In this case, all $b_i$ values are not valid. Therefore, there is no key in the list that is equal to SK.

Range Search

Problem Definition

Find the index i of the largest key $K_i$ in the list that is lower than or equal to SK. The key $K_i$ is denoted as Range Match Key (RMK).

The search algorithm involves the Searched Key (SK), the Coded Keys list, and only one key from the Keys list. If SK is smaller than all the keys (i.e., SK<$K_0$), then the matching index is defined as "−1", indicating that SK is out of range.

Theorem 5 (based on the RMK definition): If the smallest key in the list that is greater than SK is denoted as $K_{GTSK}$, then, the RMK is the contiguous smaller key $K_{GTSK-1}$, and the matching index is "GTSK−1".

Range Search Algorithm

Perform step 1 of the algorithm for the Exact Match search. Then, perform the second step as follows:

Step 2

The key search may result in one of four cases. The first three cases apply when a valid bit $b_{i\_valid}$ is found and $K_{i\_valid}$ (=PEMK) is read.

Case 1: SK=$K_{i\_valid}$

If SK=$K_{i\_valid}$, then the RMK is $K_{i\_valid}$, i.e., matching index=i_valid.

If SK≠$K_{i\_valid}$ then:

Compare SK with $K_{i\_valid}$ bit by bit, from the MSB toward the LSB. Define the Most Significant Mismatch bit (MSMb) as the index of the MSB where $sk_{MSMb} \neq k^{i\_valid}{}_{MSMb}$, i.e., $$sk_n = k^{i\_valid}{}_n \text{ for } N-1 \geq n > MSMb$$

$$sk_{MSMb} \neq k^{i\_valid}{}_{MSMb}$$

Case 2: SK>$K_{i\_valid}$

If SK>$K_{i\_valid}$, then:

Search the Coded Key list, starting from $CK_{i\_valid+1}$ to $CK_{M-1}$, for the first value that is greater than MSMb ($CK_i$>MSMb).

If this value $CK_i$ is found, then the RMK is $K_{i-1}$, which is the key before $K_i$; i.e., matching index=i−1.

If such a value is not found, then the RMK is the last key in the list, i.e., matching index=M−1.

Case 3: SK<$K_{i\_valid}$

If SK<$K_{i\_valid}$, then:

Search the Coded Key list, starting from $CK_{i\_valid}$ toward $CK_1$, for the first value that is greater than MSMb ($CK_i$>MSMb).

If a value $CK_i$ is found, then the RMK is $K_{i-1}$, which is the key before $K_i$; i.e., matching index=i−1.

If $CK_i$ is not found ($CK_i$<MSMb for all i, 1≤i≤i_valid), the matching index=−1, indicating that SK is out of range.

Case 4: Valid Bit Not Found

If a valid bit is not found, then set $K_{i\_valid}=K_0$.

If SK<$K_{i\_valid}$, then matching index=−1 (SK is out of range, as in case 3).

If SK>$K_{i\_valid}$, then search for the RMK as in case 2.

Proof of the Range Search Algorithm

Step 4 in the algorithm, which yields the search result, defines different actions for four different cases. We prove the algorithm for each of these cases separately.

Case 1: SK=$K_{i\_valid}$

If SK=$K_{i\_valid}$ then, according to the problem definition, $K_{i\_valid}$ is the RMK, i.e., the largest key that is lower than or equal to SK. Thus, matching index=i_valid.

Case 2: SK>$K_{i\_valid}$

According to Theorem 5, if we find the first (smallest) key in the list that is greater than SK, i.e., $K_{GTSK}$, then we determine the RMK, which is the contiguous smaller key $K_{GTSK-1}$. Thus, matching index=GTSK−1.

The algorithm compares SK with $K_{i\_valid}$, and finds MSMb. The algorithm then searches for the first Coded Key from $CK_{i\_valid+1}$ to $CK_{M-1}$ where $CK_i$>MSMb. We will prove now that if such a value is found, then this $CK_i$ is $CK_{GTSK}$, meaning that $K_{GTSK}$ is the first key that is greater than SK.

Since SK is greater than $K_{i\_valid}$, then $K_{GTSK}$ must be a key in the list that is greater than $K_{i\_valid}$.

We search the Coded Key values from $CK_{i\_valid+1}$ to $CK_{M-1}$ to find the first value where $CK_i$>MSMb; this value is denoted as $CK_{GTMSMb}$. We claim that $CK_{GTMSMb}=CK_{GTSK}$.

Proof:
1. For j>MSMb, $sk_j = k^{i\_valid}{}_j$, For j=MSMb, $sk_{MSMb}=1$, $k^{i\_valid}{}_{MSMb}=0$ because SK>$K_{i\_valid}$
2. We prove here that if $CK_{i\_valid+1}$<MSMb, $CK_{i\_valid+2}$<MSMb, ..., $CK_i$<MSMb, then $K_i$ is lower than SK.

If $CK_{i\_valid+1}$<MSMb then, $$k^{i\_valid+1}{}_{N-1}=k^{i\_valid}{}_{N-1}, \quad k^{i\_valid+1}{}_{N-2}= k^{i\_valid}{}_{N-2}, \ldots, k^{i\_valid+1}{}_{MSMb}=k^{i\_valid}{}_{MSMb}=0$$

If $CK_{i\_valid+2}$<MSMb then, $$k^{i\_valid+2}{}_{N-1}=k^{i\_valid+1}{}_{N-1}, \quad k^{i\_valid+2}{}_{N-2}= k^{i\_valid+1}{}_{N-2}, \ldots, k^{i\_valid+2}{}_{MSMb}= k^{i\_valid+1}{}_{MSMb}=0$$

and so on.

Thus, if all the Coded Keys from $CK_{i\_valid+1}$ to $CK_i$ (i_valid+1≤i) are lower than MSMb, we obtain:

$$k^i{}_{N-1}=k^{i-1}{}_{N-1}=\ldots=k^{i\_valid}{}_{N-1}=sk_{N-1}$$

$$k^i{}_{N-2}=k^{i-1}{}_{N-2}=\ldots=k^{i\_valid}{}_{N-2}=sk_{N-2}\ldots$$

$$k^i{}_{MSMb+1}=k^{i-1}{}_{MSMb+1}=\ldots=k^{i\_valid}{}_{MSMb+1}=sk_{MSMb+1}$$

$$k^i{}_{MSMb}=k^{i-1}{}_{MSMb}=\ldots=k^{i\_valid}{}_{MSMb}=0, sk_{MSMb}=1$$

Therefore, SK is greater than $K_i$.
3. If $CK_{GTMSMb}$>MSMb, then all the more significant bits of $K_{GTMSMb}$ until index $CK_{GTMSMb}$ (excluded) are the same as the bits of $K_{GTMSMb-1}$. At index $CK_{GTMSMb}$, $K_{GTMSMb}$ is 1 and $K_{GTMSMb-1}$ is 0. Denote $CK_{GTMSMb}$ as CKG; then:

$$k^{GTMSMb}{}_{N-1}=k^{GTMSMb-1}{}_{N-1}=k^{i\_valid}{}_{N-1}=sk_{N-1}$$
(N−1>CKG)

$$k^{GTMSMb}{}_{N-2}=k^{GTMSMb-1}{}_{N-2}=k^{i\_valid}{}_{N-2}=sk_{N-2}$$
(N−2>CKG)...

$$k^{GTMSMb}{}_{CKG}=1, k^{GTMSMb-1}{}_{CKG}=0=k^{i\_valid}{}_{CKG}$$

$$k^{i\_valid}{}_{CKG}=sk_{CKG}, \text{ because CKG>MSMb.}$$

We proved that the more significant bits of SK and $K_{GTMSMb}$ are equal until bit index CKG (excluded). At this index, $k^{GTMSMb}{}_{CKG}$ is 1 and $sk_{CKG}$ is 0. Therefore, $K_{GTMSMb}$ is greater than SK. According to proof step 2, $K_{GTMSMb-1}$ is lower than SK; thus, $K_{GTMSMb}$ is equal to $K_{GTSK}$, i.e., matching index=GTMSMb−1.
4. In this step, we prove that the case $CK_i$=MSMb, denoted as $CK_{EQMSMb}$, cannot occur for the Coded Key values ranging from $CK_{i\_valid+1}$ to $CK_{GTMSMb}$.

If $CK_{EQMSMb}$=MSMb then:

$$k^{EQMSMb}{}_{N-}=k^{i\_valid}{}_{N-}=sk_{N-}(N-1>MSMb)$$

$$k^{EQMSMb}{}_{N-2}=k^{i\_valid}{}_{N-2}=sk_{N-2}(N-2>MSMb)$$

...

$$k^{EQMSMb}{}_{MSMb}=1, k^{EQMSMb-1}{}_{MSMb}=0=k^{i\_valid}{}_{MSMb}$$

According to proof step 1, $sk_{MSMb}=1$

We proved that the more significant bits of SK and $K_{EQMSMb}$ are equal until bit index MSMb (included). At bit index MSMb, they are both 1. We know that $sk_j=k^{EQMSMb}{}_j$ for j≥MSMb. However, all the values $b_i$ for i>i_valid are not valid. Therefore, $b_{EQMSMb}$ is not valid. According to Theorem 3, for some bit index j, j≥MSMb, $k^{EQMSMb}{}_j=1$ where $sk_j=0$. But, we proved that $sk_j=k^{EQMSMb}{}_j$ for j≥MSMb. Thus, we reached a contradiction, meaning that $CK_{EQMSMb}$ cannot be equal to MSMb.

If, for $CK_i$, i_valid+1≦i≦M−1, all $CK_i$<MSMb, then, according to proof step 2, all keys $K_i$, i_valid+1≦i≦M−1, are lower than SK. Therefore, the largest key in the list which is lower than or equal SK is the last key, so matching index=M−1.

Case 3: SK<$K_{i\_valid}$

Assume that the first key in the Keys list is lower or equal to SK. We search for the greatest key that is lower than or equal to SK (RMK). Denote its Coded Key as $CK_{RMK}$.

The algorithm compares SK with $K_{i\_valid}$, and finds MSMb. Then it searches for the first Coded Key from $CK_{i\_valid}$ to $CK_1$ where $CK_i$>MSMb. Denote this value as $CK_{GTMSMb}$.

We will prove that $CK_{GTMSMb-1}$=$CK_{RMK}$.

Proof:

1. For j>MSMb, $sk_j=k^{i-valid}_j$, For j=MSMb, $sk_{MSMb}=0$, $k^{i-valid}_{MSMb}=1$ because SK<$K_{i\_valid}$ 2. We will prove here that if $CK_{i\_valid}$<MSMb, $CK_{i\_valid-1}$<MSMb, ..., $CK_i$<MSMb, $K_{i-1}$ is greater than SK.

If $CK_{i\_valid}$<MSMb then, $$k^{i-valid}_{N-1}=k^{i-valid-1}_{N-1},$$
   $$k^{i-valid}_{N-2}=k^{i-valid-1}_{N-2},$$
   $$k^{i-valid}_{MSMb}=k^{i-valid-1}_{MSMb}$$

If $CK_{i\_valid-1}$<MSMb then, $$k^{i-valid-1}_{N-1}=k^{i-valid-2}_{N-1},$$
   $$k^{i-valid-1}_{N-2}=k^{i-valid-2}_{N-2},$$
   $$k^{i-valid-1}_{MSMb}=k^{i-valid-2}_{MSMb}$$

and so on.

So, if all the coded keys from $CK_{i\_valid}$ to $CK_i$ (i_valid≧i) are lower than MSMb, we will get:

$$k^{i-1}_{N-1}=k^i_{N-1}=\ldots=k^{i-valid}_{N-1}=sk_{N-1}$$

$$k^{i-1}_{N-2}=k^i_{N-2}=\ldots=k^{i-valid}_{N-2}=sk_{N-2}\ldots$$

$$k^{i-1}_{MSMb+1}=k^i_{MSMb+1}=\ldots=k^{i-valid}_{MSMb+1}=sk_{MSMb+1}$$

$$k^{i-1}_{MSMb}=k^i_{MSMb}=\ldots=k^{i-valid}_{MSMb}=1, sk_{MSMb}=0$$

Therefore, $K_{i-1}$ is greater than SK.

3. If $CK_{GTMSMb}$>MSMb, then all the more significant bits of $K_{GTMSMb}$ until index $CK_{GTMSMb}$ (excluded) are the same as the bits of $K_{GTMSMb-1}$. At bit index $CK_{GTMSMb}$, $K_{GTMSMb}$ is 1 and $K_{GTMSMb-1}$ is 0. Denote $CK_{GTMSMb}$ as CKG, then:

$$k^{GTMSMb-1}_{N-1}=k^{GTMSMb}_{N-1}=k^{i-valid}_{N-1}=sk_{N-1}$$
   (N−1>CKG)

$$k^{GTMSMb-1}_{N-2}=k^{GTMSMb}_{N-2}=k^{i-valid}_{N-2}=sk_{N-2}$$
   (N−2>CKG), ..., $$k^{GTMSMb-1}_{CKG}=0, k^{GTMSMb}_{CKG}=1=k^{i-valid}_{CKG}$$

$k^{i-valid}_{CKG}=sk_{CKG}$, because CKG>MSMb.

We have demonstrated that the more significant bits of SK and $K_{GTMSMb-1}$ are equal until bit index CKG (excluded). At this index, $k^{GTMSMb-1}_{CKG}$ is 0 and $sk_{CKG}$ is 1. Therefore, $K_{GTMSMb-1}$ is lower than SK. According to proof step 2, $K_{GTMSMb}$ is greater than SK; thus, $K_{GTMSMb-1}$ is equal to the RMK, i.e., matching index=GTMSMb−1.

4. If $CK_{EQMSMb}$=MSMb ($CK_{EQMSMb+1}$<MSMb, ..., $CK_{i\_valid}$< MSMb) then:

$k^{EQMSMb}_{MSMb}=1$, and therefore, $pk^{EQMSMb}_{MSMb}=1$ $CK_{EQMSMb+1}$<MSMb, and therefore, $pk^{EQMSMb+1}_{MSMb}=1, \ldots,$ $CK_{i\_valid}$<MSMb, and therefore also $pk^{i-valid}_{MSMb}=1$ We know that $sk^{i-valid}_{MSMb}=0$ We have proven that $PK_{i\_valid}$ has 1 at the same bit index (i_valid) where SK has 0, so its $b_i$ value ($b_{i\_valid}$) is not valid. However, we started with the assumption that $b_{i\_valid}$ is valid. Thus, we reached a contradiction, meaning that $CK_{EQMSMb}$ cannot be equal to MSMb.

If, for $CK_i$, 1≦i≦i_valid, all $CK_i$<MSMb, then, according to proof step 2, $K_0$ is greater than SK. According to the problem definition, matching index=−1, indicating that SK is out of range.

Case 4: Valid Bit Not Found

If a valid bit is not found, then it means that for all $b_i$, 0≦i≦M−1, $b_i$ is not valid.

If SK<$K_0$, then according to the problem definition, matching index=−1.

If SK>$K_0$, then the algorithm sets i_valid=0, and performs the same procedure as in the case of SK>$K_{i\_valid}$ (case 2). If i_valid=0, then the two following statements are true:

1. SK>$K_0$, i.e., SK>$K_{i\_valid}$.
2. All the $b_i$ values where i≧0, i.e., i≧i_valid, are not valid.

The proof for the case SK>$K_{i\_valid}$ uses the initial problem definition data, and the above statements (1) and (2). In other words, all the facts assumed in case 2 are true for this case also when i_valid=0. Therefore, the algorithm for case 2 is also applicable to this case.

The case of SK=$K_0$ is impossible, because, according to Theorem 4, if SK=$K_0$, then $b_0$ is valid. But, $b_0$ in this case is not valid.

As used herein in the specification and in the claims section that follows, the term "monotonic order" and the like refer to one or more rows (or one or more columns) in an array in which the key entries (e.g., range boundary values) are in ascending order or in descending order. This can be achieved in various ways, as demonstrated hereinabove. The term "monotonic order" specifically includes rows having a cyclic monotonic order, e.g., 9,15,69,81,2,4,7, or 23,105,222,611, 8,14.

As used herein in the specification and in the claims section that follows, the terms "coded key entry", "coded entry" and the like refer to a key entry resulting from a transformation of at least one ("original") key entry, wherein the coded entry is compact with respect to the at least one original key entry.

As used herein in the specification and in the claims section that follows, the term "deterministic transformation" refers to a transformation of at least one key entry to a coded key entry, in which the size of the coded entry depends on the size of the at least one key entry.

As used herein in the specification and in the claims section that follows, the term "pre-determined transformation" refers to a transformation of at least one key entry to a coded key entry, in which the function for performing the transformation is independent of the specific content of the particular key entries being transformed.

As used herein in the specification and in the claims section that follows, the term "pre-determined search" refers to a search within a node (in the case of a search tree structure) or a list, in which the amount of data required to perform the search is pre-determined, i.e., can be calculated in advance.

The term is specifically meant to exclude the partial key methods taught by Bohannon, et al., in which the amount of data required for a particular search is fundamentally not determinable in advance.

As used herein in the specification and in the claims section that follows, the term "deterministic search" refers to at least one of the following:

(1) a search within a node (in the case of a search tree structure) or a list, in which the amount of data retrieved is substantially independent of specific key data. This search is termed "deterministic with respect to specific key data";

(2) a search within a node (in the case of a search tree structure) or a list, in which the required amount of data for searching the node or list consists of coded data and auxiliary data (non-zero), and wherein the required amount of auxiliary data is substantially independent of the number of keys in the node or list. This search is termed "deterministic with respect to a required amount of auxiliary data".

The term "deterministic search" is specifically meant to exclude the partial key methods taught by Bohannon, et al., in which the amount of data required for a particular search depends on specific key data and in which the required amount of auxiliary data depends on the number of keys in the node, i.e., as the number of keys in the node increases, in the worst-case scenario, additional key retrievals are required.

As used herein in the specification and in the claims section that follows, the term "specific key data" and the like refers to at least one of the following:

(1) the particular search (or "input") key in the current search;

(2) the particular original key entries of a list or node being searched;

(3) the coded key entries in a list or node being searched.

As used herein in the specification and in the claims section that follows, the term "varying bit", used with respect to two or more key entries, refers to a bit in which there exists a difference between the compared key entries.

As used herein in the specification and in the claims section that follows, the term "data structure" and the like refers to a node or list for data.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer-implemented method of searching an ordered database using transformed key entries, the method comprising the steps of:
   (a) providing a system including:
      (i) a memory adapted to store a plurality of key entries, and
      (ii) processing logic operative to:
         (A) transform each key entry of said key entries into a respective coded entry, said respective coded entry containing information corresponding to some information present in said key entry, and
         (B) search said coded entries;
   (b) performing a pre-determined transformation of each said key entry to produce said respective coded entry, to obtain a plurality of coded entries, and
   (c) performing a deterministic search in at least one data structure within said memory to obtain a match between an input key and a key entry of said key entries,
   wherein a length, expressed as a number of bits, of said respective coded entry is reduced with respect to a length, expressed as a number of bits, of said key entry from which said respective coded entry was transformed,
   and wherein a function operative to perform said pre-determined transformation is substantially independent of specific content of each said key entry of said key entries.

2. The method of claim 1, wherein said match is a unique match.

3. The method of claim 1, wherein said match is a particular match, and wherein performing said deterministic search in said at least one data structure includes:
   (i) searching said coded entries to identify a potential match between said input key and said key entry of said key entries, and
   (ii) searching said key entries to determine whether said potential match is said particular match.

4. The method of claim 1, wherein said search is deterministic with respect to specific key data, and wherein said specific key data includes said key entries.

5. The method of claim 1, wherein said search is deterministic with respect to specific key data, and wherein said specific key data includes said coded entries in said data structure.

6. The method of claim 1, wherein said search is deterministic with respect to a required amount of auxiliary data.

7. The method of claim 1, wherein each coded entry of said coded entries includes information relating to at least one different key entry of said key entries.

8. The method of claim 7, wherein said at least one different key entry is a single key entry.

9. The method of claim 7, wherein said information includes positional information.

10. The method of claim 1, wherein said transformation is a deterministic transformation in which said length of said respective coded entry depends on said length of said key entry from which said respective coded entry was transformed.

11. The method of claim 10, wherein said length of said respective coded entry depends solely on said length of said key entry from which said respective coded entry was transformed.

12. The method of claim 1, wherein said performing of said deterministic search includes:
   (i) processing said coded keys to determine a required set of auxiliary data, said set being required to proceed with said search, and
   (ii) using said required set of auxiliary data to perform an additional processing of said coded keys to determine a result of said search.

13. The method of claim 12, wherein said auxiliary data includes a portion of a key entry, and wherein said portion is then compared to said input key.

14. The method of claim 1, wherein said search is an exact search, and wherein said performing of said deterministic search includes:

(i) processing said coded keys to determine a required set of auxiliary data, said set being required to proceed with said search, and (ii) comparing said set with said input key to determine a result of said search.

15. The method of claim 1, wherein for said key entries of any finite length, said length of each said respective coded entry, after performing said transformation, is up to a closest integer larger than log base 2 of said length of said key entry from which said respective coded entry was transformed.

16. The method of claim 1, wherein for said key entries of any finite length, said length of each said respective coded entry, after performing said transformation, is substantially equal to a rounded up, closest integer of log base 2 of said length of said key entry from which said respective coded entry was transformed.

17. The method of claim 1, wherein said transformation is a unidirectional transformation.

18. A computer-implemented method of searching an ordered database using transformed key entries, the method comprising the steps of:

(a) providing a system including:
   (i) a memory adapted to store a plurality of key entries, and
   (ii) processing logic operative to:
      (A) transform each key entry of said key entries into a respective coded entry, and
      (B) search said coded entries;

(b) performing a transformation of each said key entry to produce said respective coded entry, to obtain a plurality of coded entries, said respective coded entry containing information corresponding to some information present in said key entry;

(c) arranging said coded entries in a search-tree structure having at least one node, such that each of said at least one node includes a particular plurality of said plurality of coded entries, and (d) performing a deterministic search within said at least one node of said search-tree structure to obtain a match between an input key and a key entry of said key entries, wherein a length, expressed as a number of bits, of said respective coded entry is reduced with respect to a length, expressed as a number of bits, of said key entry from which said respective coded entry was transformed.

19. The method of claim 18, wherein each said coded entry of said coded entries includes information relating to at least one different key entry.

20. The method of claim 18, wherein each coded entry of said coded entries includes positional information relating to a different respective key entry.

21. The method of claim 18, wherein said transformation is a deterministic transformation in which a length of said respective coded entry depends on a length of said key entry from which said respective coded entry was transformed.

22. The method of claim 21, wherein said length of said respective coded entry depends solely on said length of said key entry from which said respective coded entry was transformed.

23. The method of claim 21, wherein for said key entries of any finite length, said length of each said respective coded entry, after performing said transformation, is substantially equal to a rounded up, closest integer of log base 2 of said length of said key entry from which said respective coded entry was transformed.

24. The method of claim 18, wherein said transformation is a pre-determined transformation wherein a function operative to perform said pre-determined transformation is substantially independent of specific content of each said key entry of said key entries.

25. The method of claim 18, wherein for said key entries of any finite length, a length of each said respective coded entry, after performing said transformation, is up to a closest integer larger than log base 2 of said length of said key entry.

26. The method of claim 25, wherein said auxiliary data includes at least a portion of a key entry of said key entries.

27. The method of claim 26, wherein a size of said auxiliary data equals less than half of a size of said key entries.

28. The method of claim 25, wherein said auxiliary data is a portion of a single key entry.

29. The method of claim 18, wherein said information corresponding to some information present in said key entry includes information resulting from at least one varying bit.

30. The method of claim 29, wherein said at least one varying bit includes a most significant bit.

31. The method of claim 18, wherein said search is deterministic with respect to specific key data.

32. The method of claim 31, wherein said specific key data includes said input key.

33. The method of claim 31, wherein said specific key data includes said key entries.

34. The method of claim 18, wherein said match is a particular match, and wherein performing said deterministic search in said at least one data structure includes:
   (i) searching said coded entries to identify a potential match between said input key and said key entry of said key entries, and
   (ii) searching said key entries to determine whether said potential match is said particular match.

35. The method of claim 18, wherein said search is deterministic with respect to a required amount of auxiliary data.

36. The method of claim 18, wherein said match is a unique match.

37. A computer-implemented method of searching an ordered database using transformed key entries, the method comprising the steps of:

(a) providing a system including:
   (i) a memory adapted to store a plurality of key entries, and
   (ii) processing logic operative to:
      (A) transform each key entry of said key entries into a respective coded entry, and
      (B) search said coded entries;

(b) performing a pre-determined transformation of each said key entry to produce said respective coded entry, to obtain a plurality of coded entries, and (c) performing a deterministic search in at least one data structure within said memory to obtain a match between an input key and a key entry of said key entries, wherein a length, expressed as a number of bits, of said respective coded entry is reduced with respect to a length, expressed as a number of bits, of said key entry from which said respective coded entry was transformed, wherein a function operative to perform said pre-determined transformation is substantially independent of specific content of each said key entry of said key entries, and wherein said information includes information resulting from at least one varying bit, said at least one varying bit including a most significant bit.

38. The method of claim 37, wherein said respective coded entry contains some information present in said key entry.

39. The method of claim 37, wherein said match is a particular match, and wherein performing said deterministic search in said at least one data structure includes:

(i) searching said coded entries to identify a potential match between said input key and said key entry of said key entries, and (ii) searching said key entries to determine whether said potential match is said particular match.

40. A computer-implemented method of searching an ordered database using transformed key entries, the method comprising the steps of:

(a) providing a system including:
  (i) a memory adapted to store a plurality of key entries, and
  (ii) processing logic operative to:
    (A) transform each key entry of said key entries into a respective coded entry, and
    (B) search said coded entries;

(b) performing a transformation of each said key entry to produce said respective coded entry, to obtain a plurality of coded entries, said respective coded entry containing information corresponding to some information present in said key entry;

c) arranging said coded entries in a search-tree structure having at least one node, such that each of said at least one node includes a particular plurality of said plurality of coded entries, and d) performing a deterministic search within said at least one node of said search-tree structure to obtain a match between an input key and a key entry of said key entries, wherein a length, expressed as a number of bits, of said respective coded entry is reduced with respect to a length, expressed as a number of bits, of said key entry from which said respective coded entry was transformed, wherein a first coded entry of said coded entries includes positional information relating to a first key entry, and wherein a second coded entry of said coded entries includes positional information relating to a second key entry, said second key entry being different from said first key entry.

41. A computer-implemented method of searching an ordered database using transformed key entries, the method comprising the steps of:

(a) providing a system including:
  (i) a memory adapted to store a plurality of key entries, and
  (ii) processing logic operative to:
    (A) transform each key entry of said key entries into a respective coded entry, and
    (B) search said coded entries;

(b) performing a pre-determined transformation of each said key entry to produce said respective coded entry, to obtain a plurality of coded entries, and (c) performing a deterministic search in at least one data structure within said memory to obtain a particular match between an input key and a key entry of said key entries, wherein a length, expressed as a number of bits, of said respective coded entry is reduced with respect to a length, expressed as a number of bits, of said key entry from which said respective coded entry was transformed, wherein a function operative to perform said pre-determined transformation is substantially independent of specific content of each said key entry of said key entries, wherein performing said deterministic search in said at least one data structure includes:
  (i) searching said coded entries to identify a potential match between said input key and said key entry of said key entries, and
  (ii) searching said key entries to determine whether said potential match is said particular match.

* * * * *